United States Patent
Moser et al.

(10) Patent No.: US 11,252,014 B2
(45) Date of Patent: Feb. 15, 2022

(54) FORMING ROOT CAUSE GROUPS OF INCIDENTS IN CLUSTERED DISTRIBUTED SYSTEM THROUGH HORIZONTAL AND VERTICAL AGGREGATION

(71) Applicant: Dynatrace LLC, Waltham, MA (US)

(72) Inventors: Herwig Moser, Freistadt (AT); Hans Kohlreiter, Traun (AT)

(73) Assignee: Dynatrace LLC, Waltham, MA (US)

(*) Notice: Subject to any disclaimer, the term of this patent is extended or adjusted under 35 U.S.C. 154(b) by 0 days.

(21) Appl. No.: 17/034,079

(22) Filed: Sep. 28, 2020

(65) Prior Publication Data
US 2021/0111943 A1 Apr. 15, 2021

Related U.S. Application Data

(60) Provisional application No. 62/907,858, filed on Sep. 30, 2019.

(51) Int. Cl.
*H04L 12/24* (2006.01)
*G06N 5/00* (2006.01)

(52) U.S. Cl.
CPC ......... *H04L 41/0636* (2013.01); *G06N 5/003* (2013.01); *H04L 41/065* (2013.01); *H04L 41/12* (2013.01)

(58) Field of Classification Search
CPC ... H04L 41/0636; H04L 41/065; H04L 41/12; G06N 5/003

(Continued)

(56) References Cited

U.S. PATENT DOCUMENTS 10,083,073 B2 * 9/2018 Ambichl ............ G06F 11/0748
2006/0041659 A1 * 2/2006 Hasan ................ H04L 41/0631
709/224

(Continued)

FOREIGN PATENT DOCUMENTS

EP 3099012 A1 11/2016
EP 3531287 A1 8/2019

*Primary Examiner* — James E Springer
*Assistant Examiner* — Patrick F Ngankam
(74) *Attorney, Agent, or Firm* — Harness, Dickey & Pierce, P.L.C.

(57) ABSTRACT

A system and method for the aggregation and grouping of previously identified, causally related abnormal operating condition, that are observed in a monitored environment, is disclosed. Agents are deployed to the monitored environment which capture data describing structural aspects of the monitored environment, as well as data describing activities performed on it, like the execution of distributed transactions. The data describing structural aspects is aggregated into a topology model which describes individual components of the monitored environments, their communication activities and resource dependencies and which also identifies and groups components that serve the same purpose, like e.g. processes executing the same code. Activity related monitoring data is constantly monitored to identify abnormal operating conditions. Data describing abnormal operating condition is analyzed in combination with topology data to identify networks of causally related abnormal operating conditions. Causally related abnormal operating conditions are then grouped using known topological resource and same purpose dependencies. Identified groups are analyzed to determine their root cause relevance.

20 Claims, 16 Drawing Sheets

(58) Field of Classification Search
USPC .......................................................... 709/224
See application file for complete search history.

(56) References Cited

U.S. PATENT DOCUMENTS

| | | | |
|---|---|---|---|
| 2009/0183029 A1* | 7/2009 | Bethke | G06F 11/0709 |
| | | | 714/26 |
| 2017/0075749 A1* | 3/2017 | Ambichl | G06F 11/0748 |
| 2020/0042426 A1* | 2/2020 | Ambichl | G06F 11/3006 |

* cited by examiner

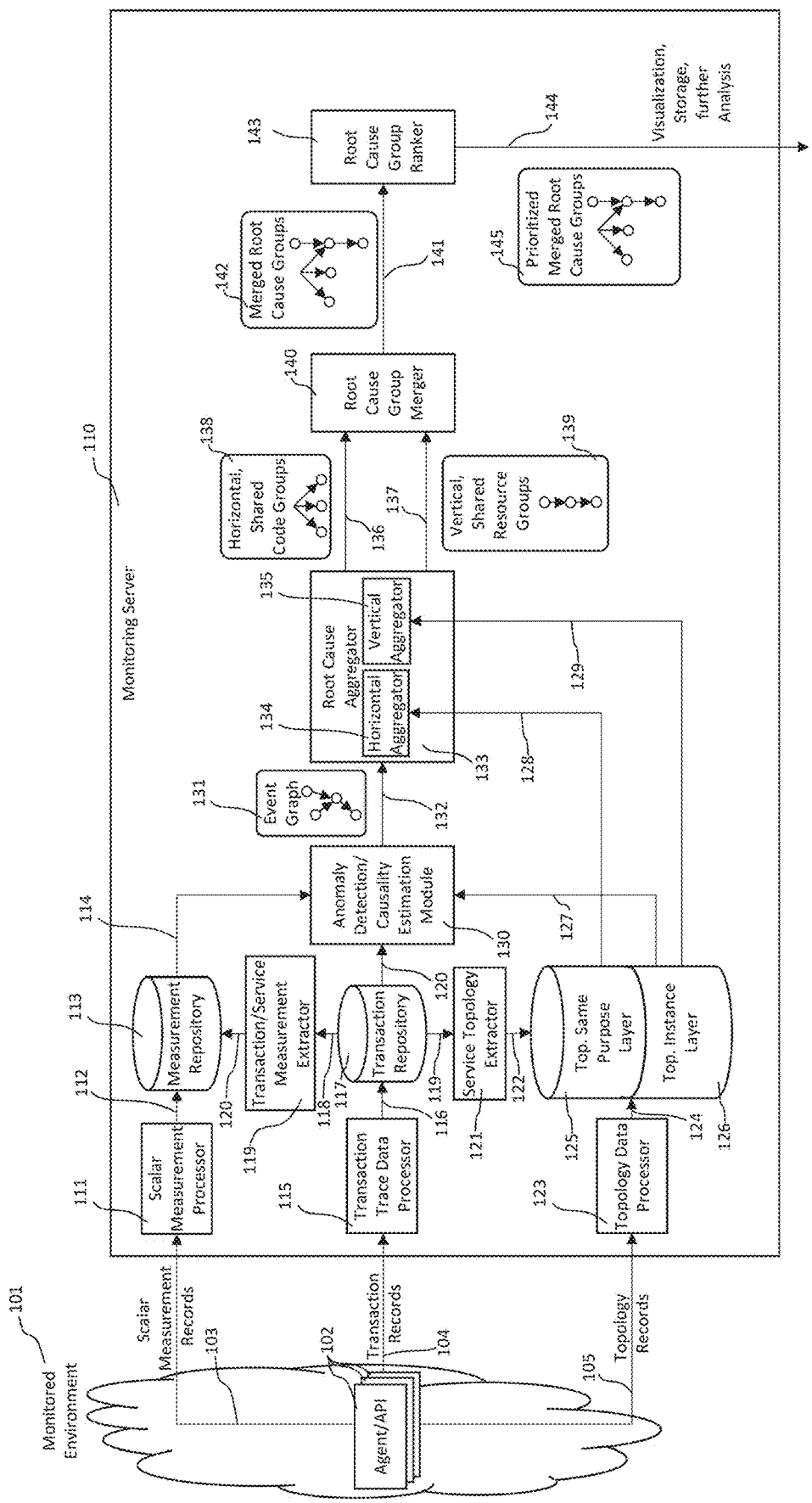
FIG 1: System Overview

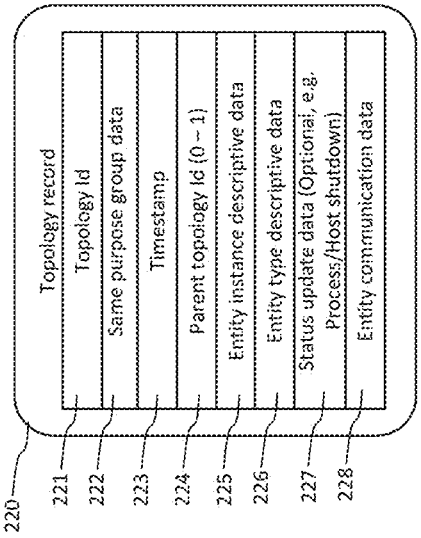
FIG 2b: Topology Record
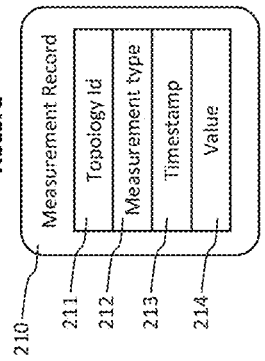
FIG 2c: Measurement Record
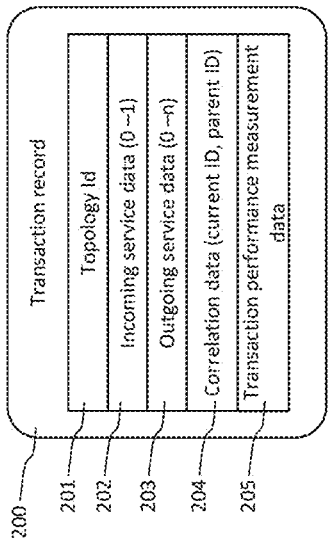
FIG 2a: Transaction Record

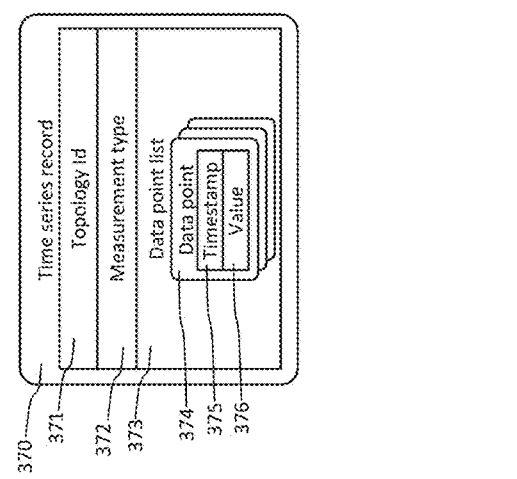
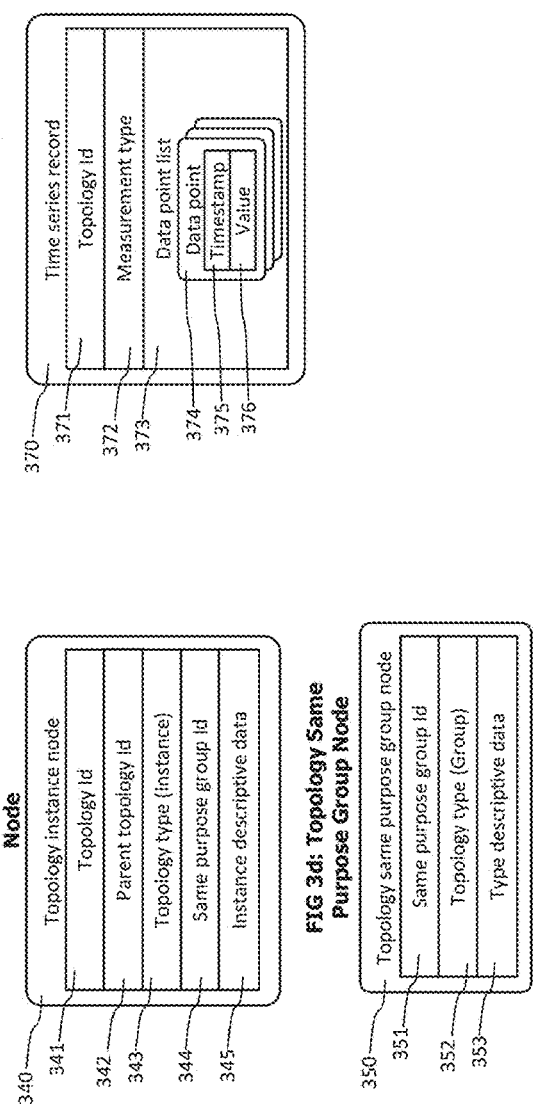
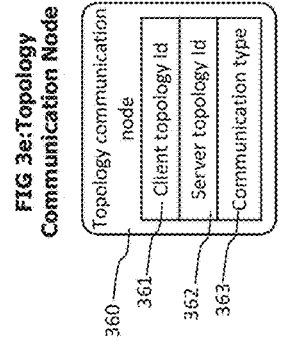
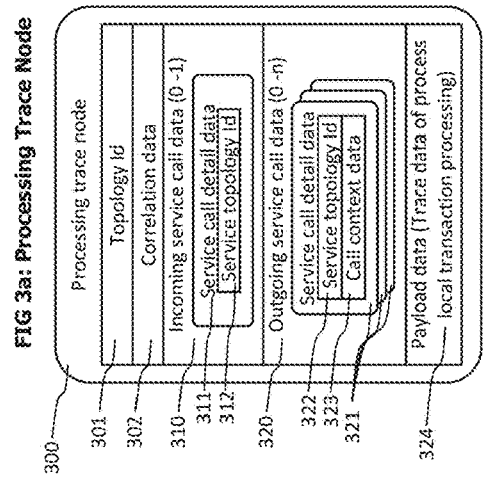
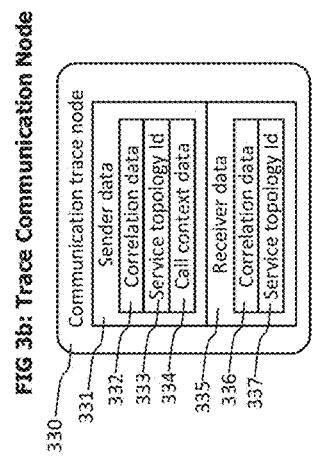

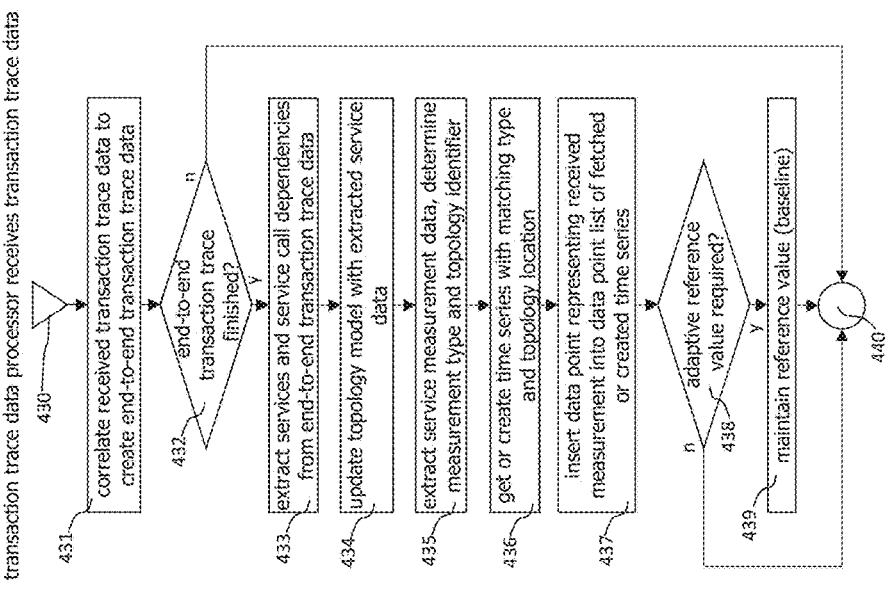
FIG 4c: Processing of Received Transaction Trace Records
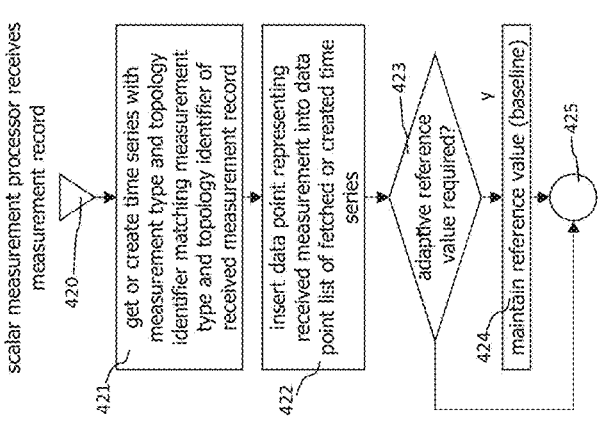
FIG 4b: Processing of Received Scalar Measurement Record
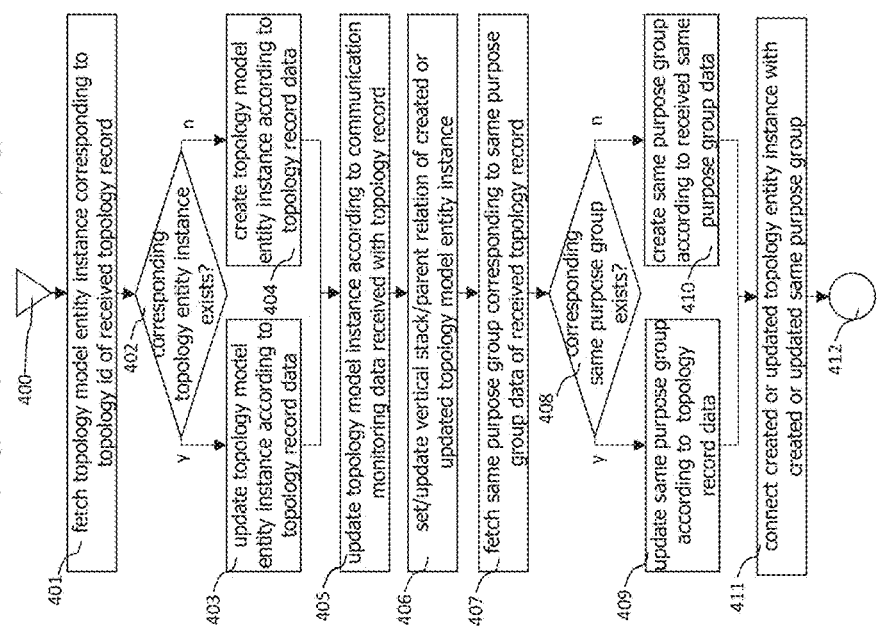
FIG 4a: Processing Received Topology Records

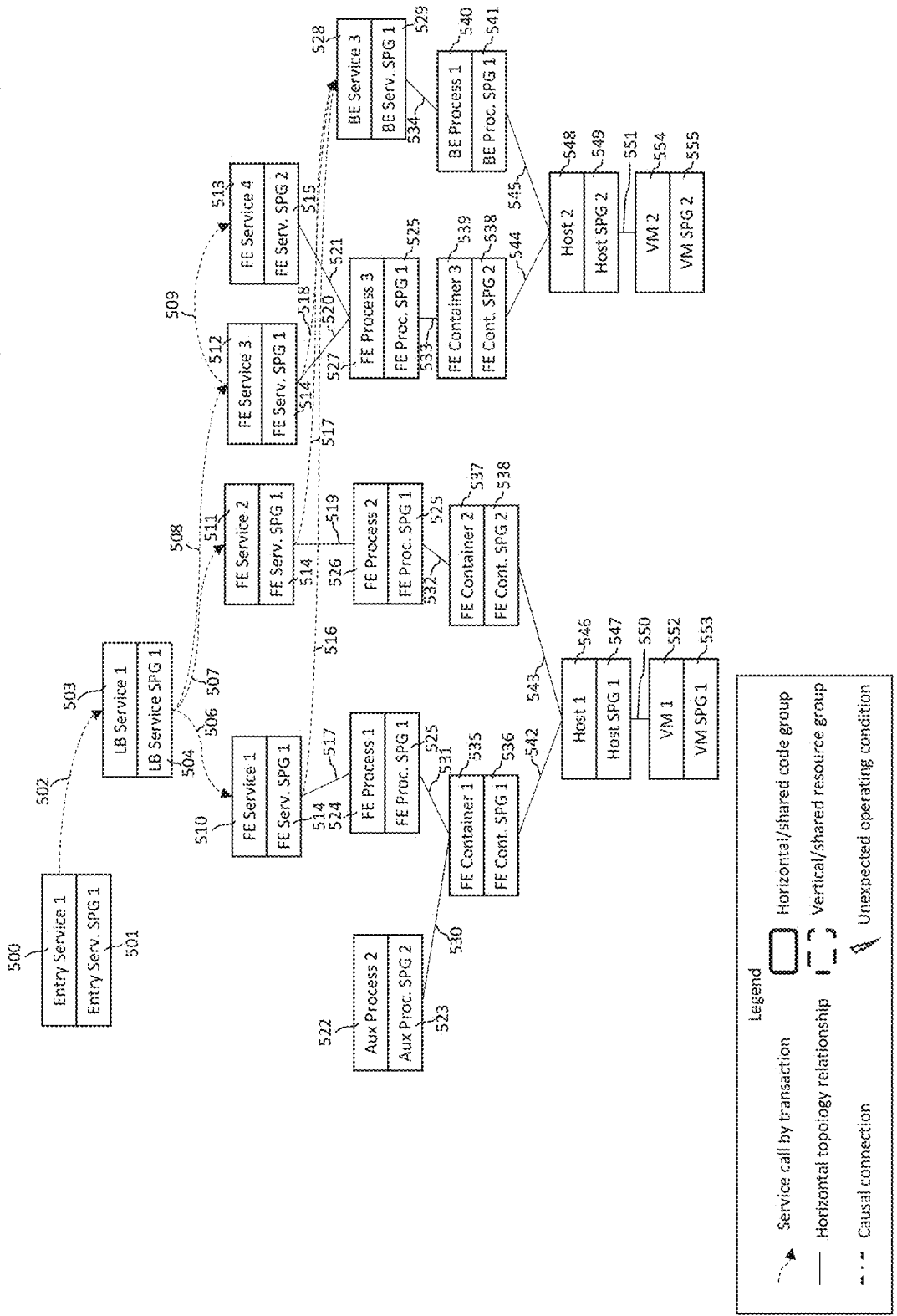

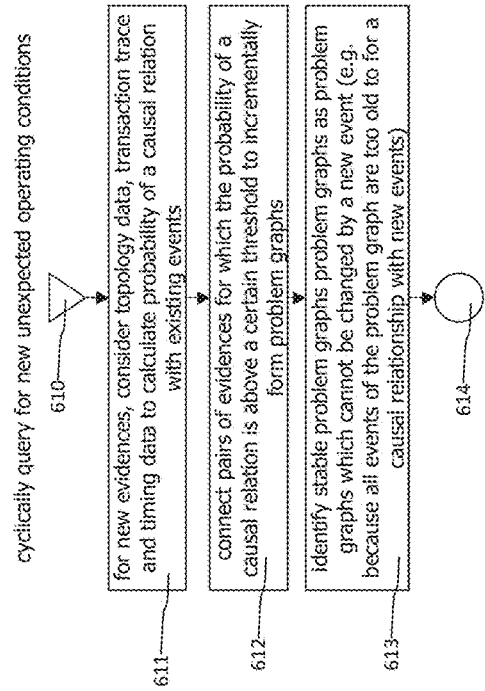
FIG 6b: Variant Event Pair Analysis Based
cyclically query for new unexpected operating conditions
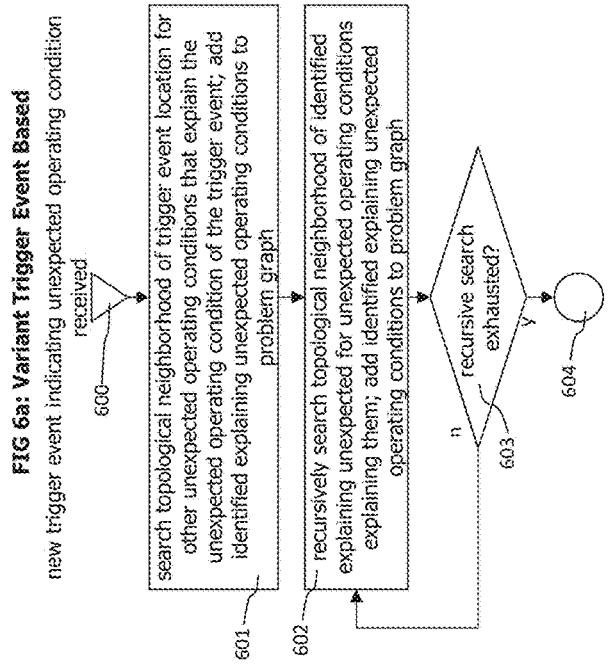
FIG 6a: Variant Trigger Event Based
new trigger event indicating unexpected operating condition received

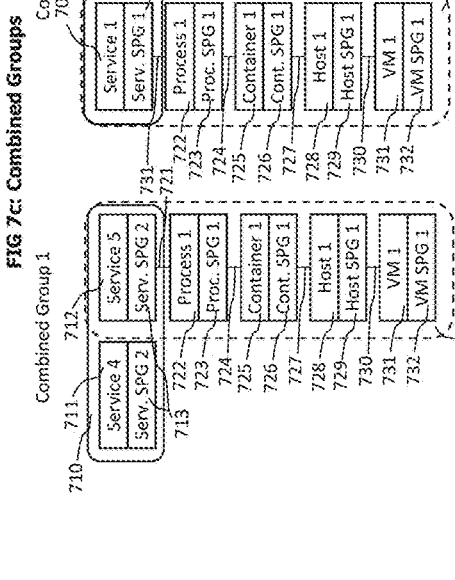
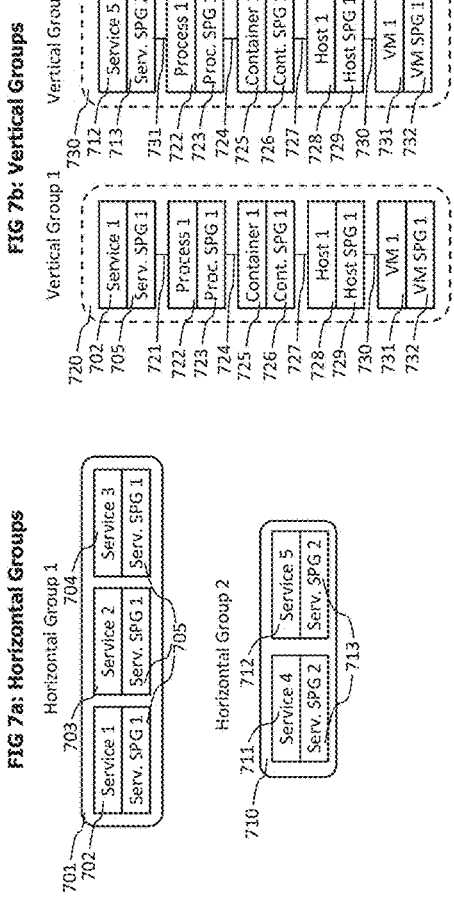

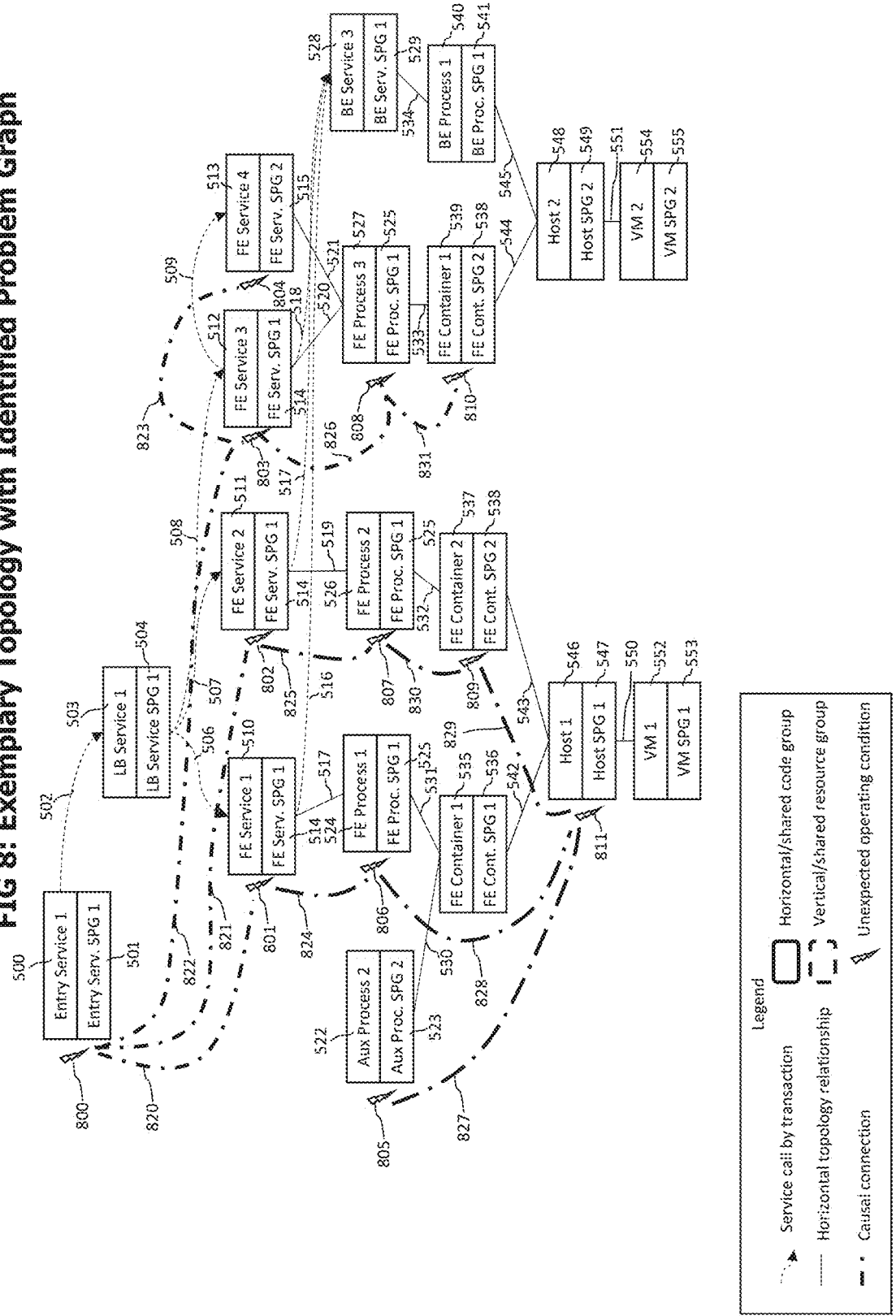

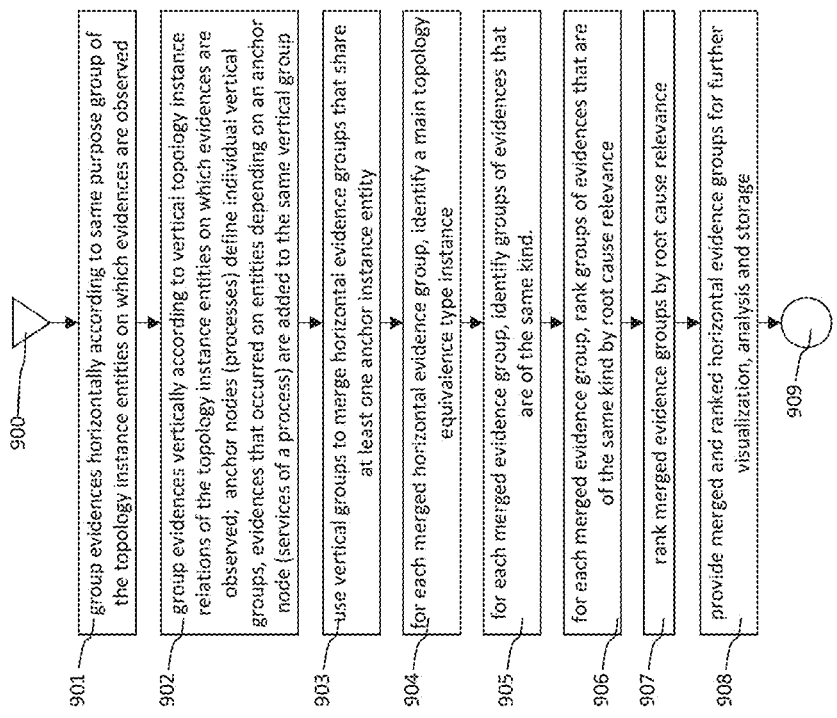

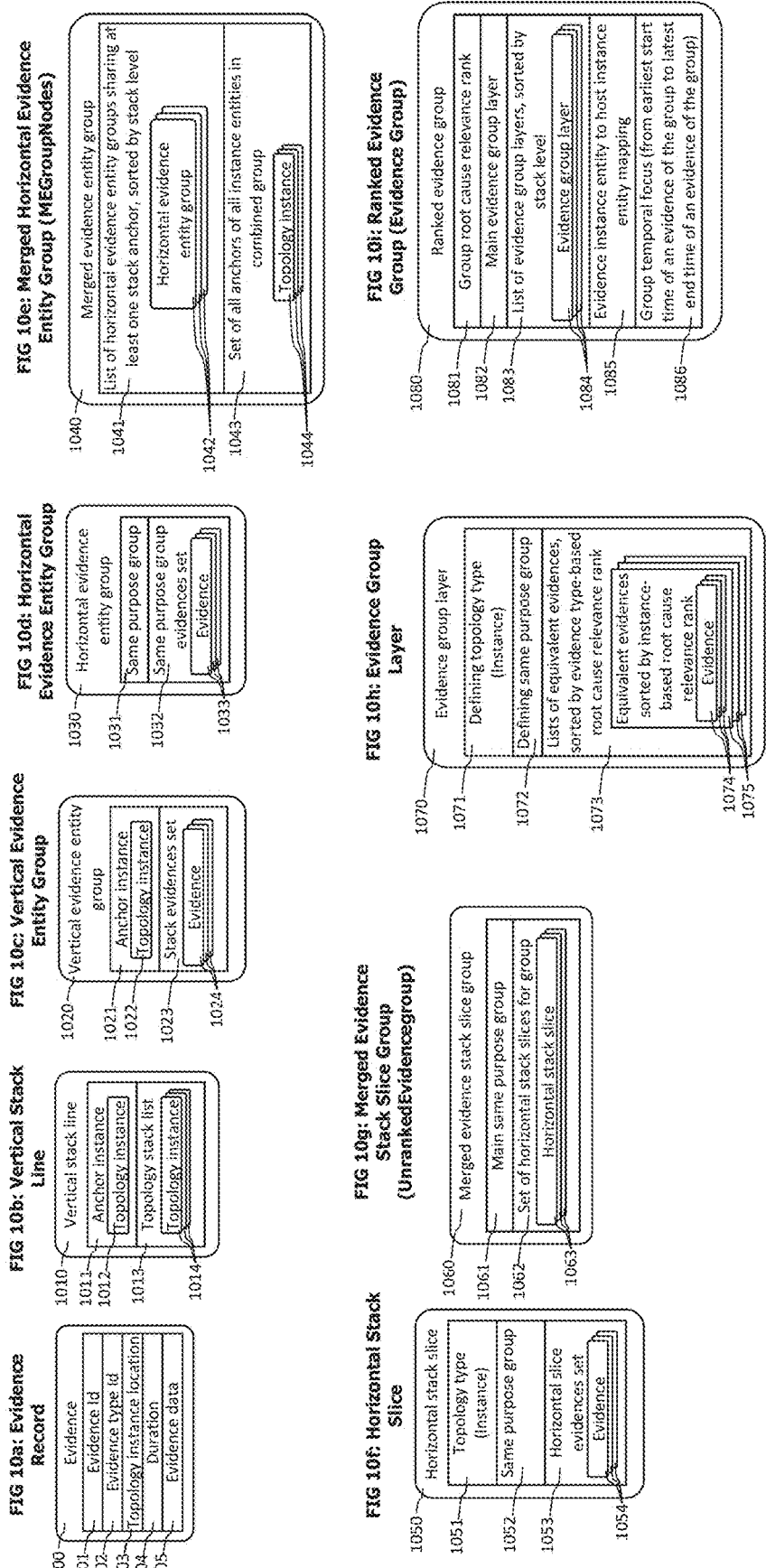

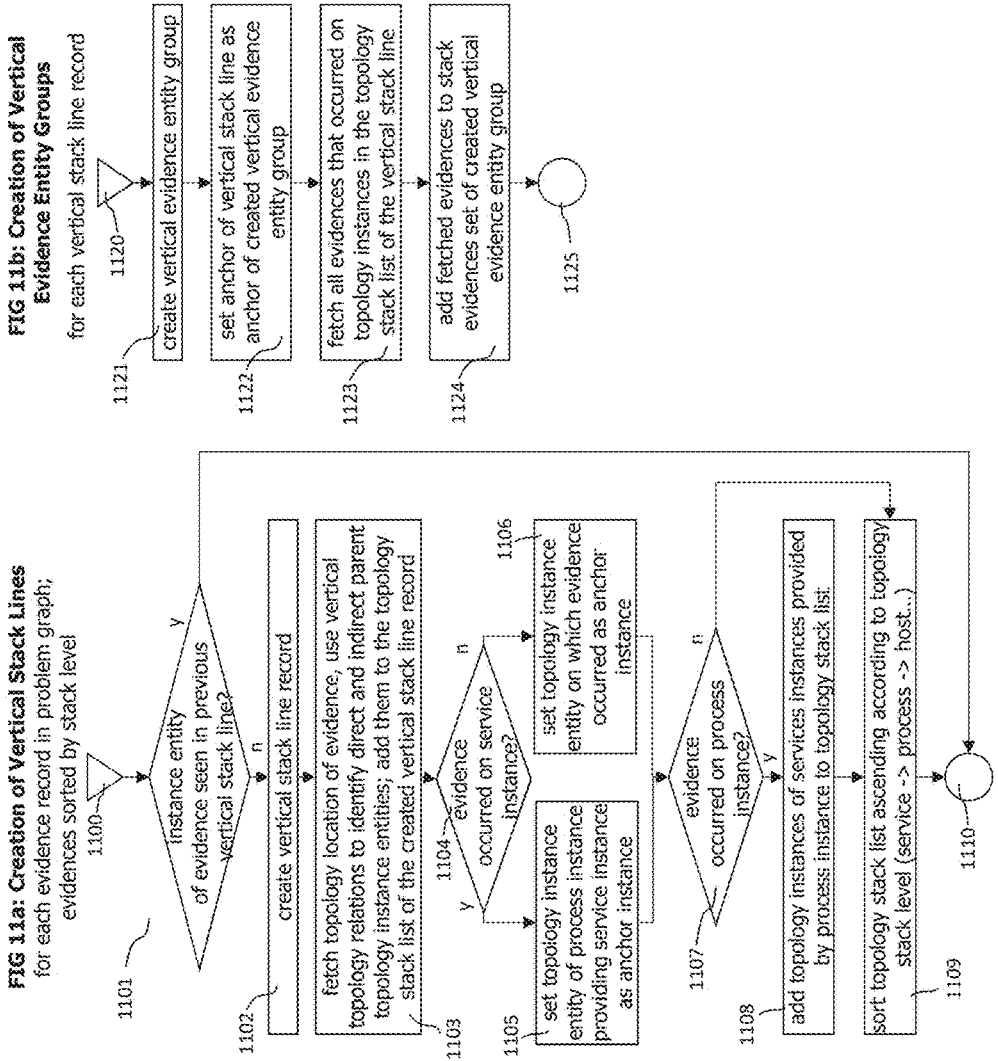

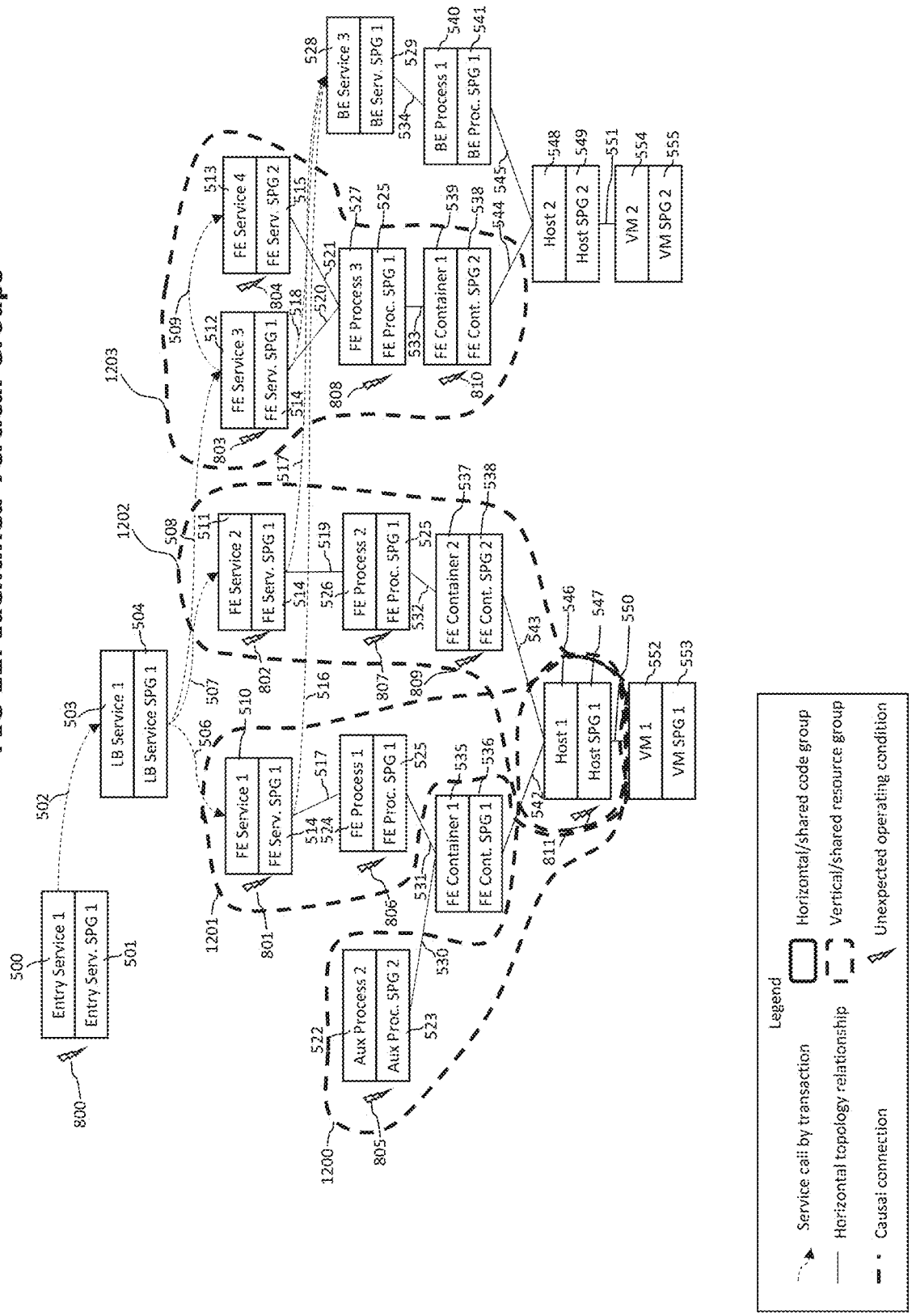
FIG 12: Identified Vertical Groups

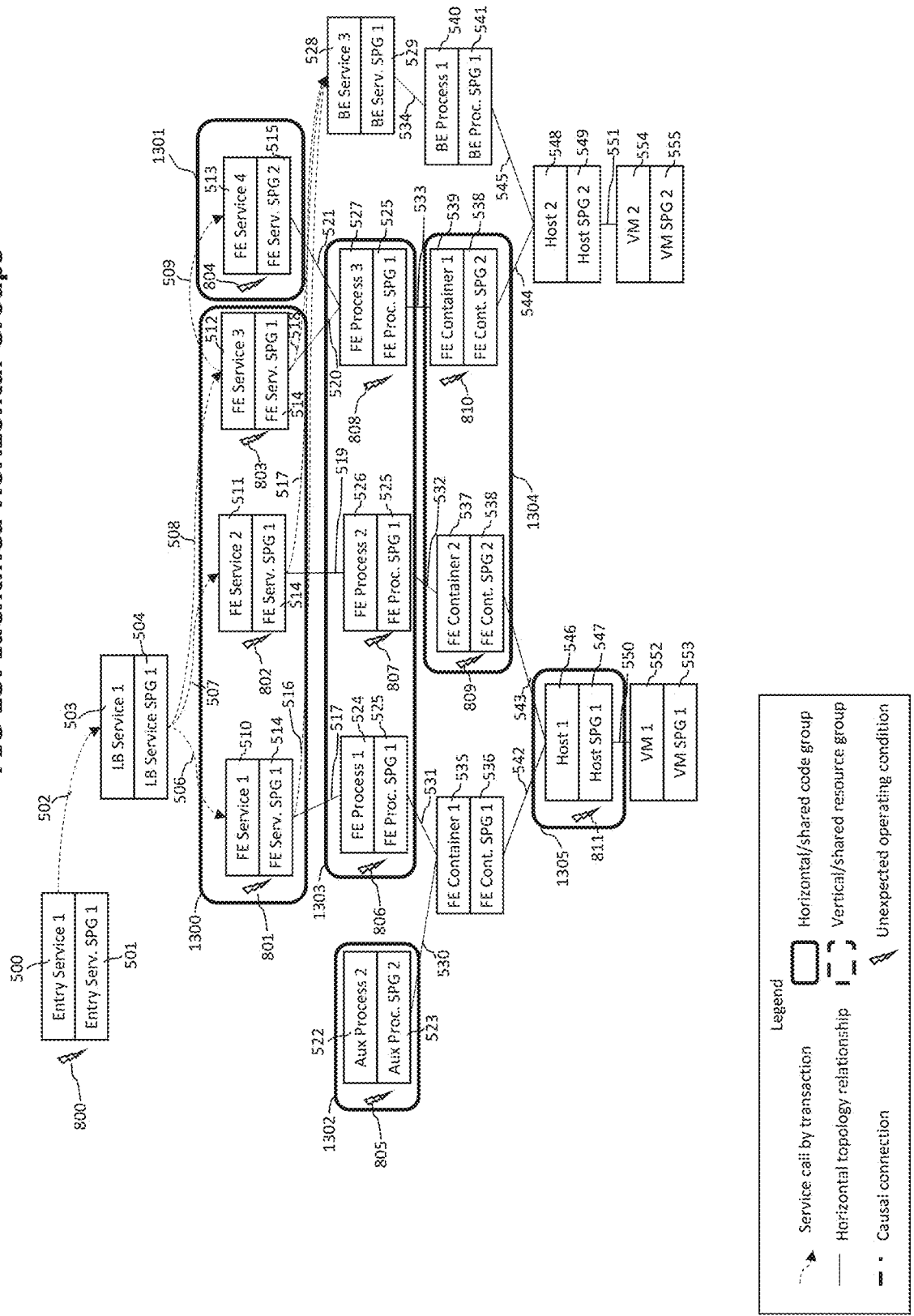

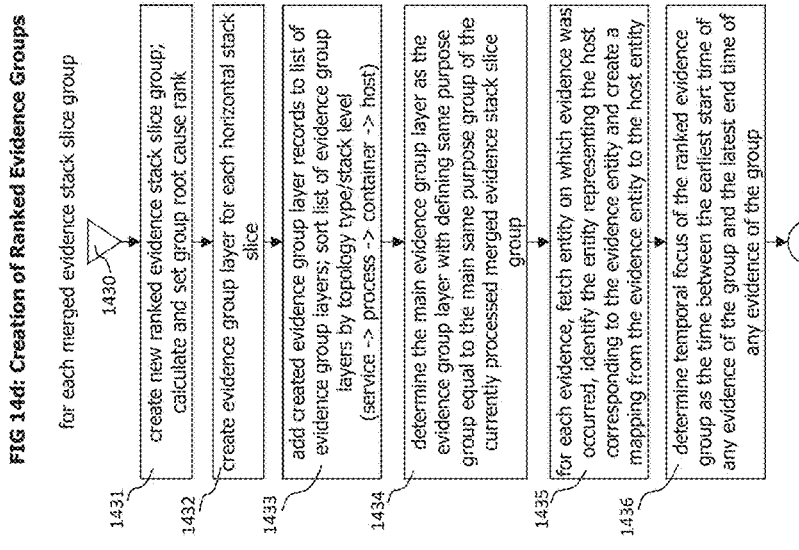
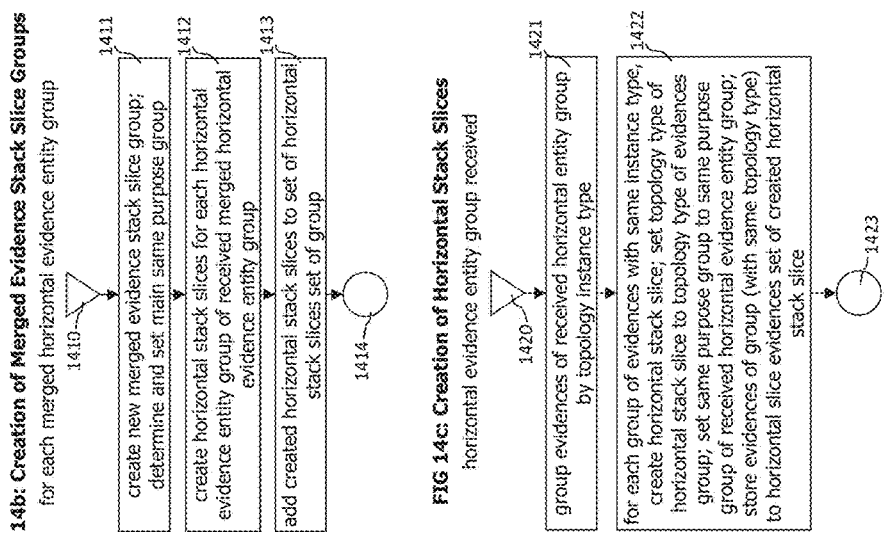
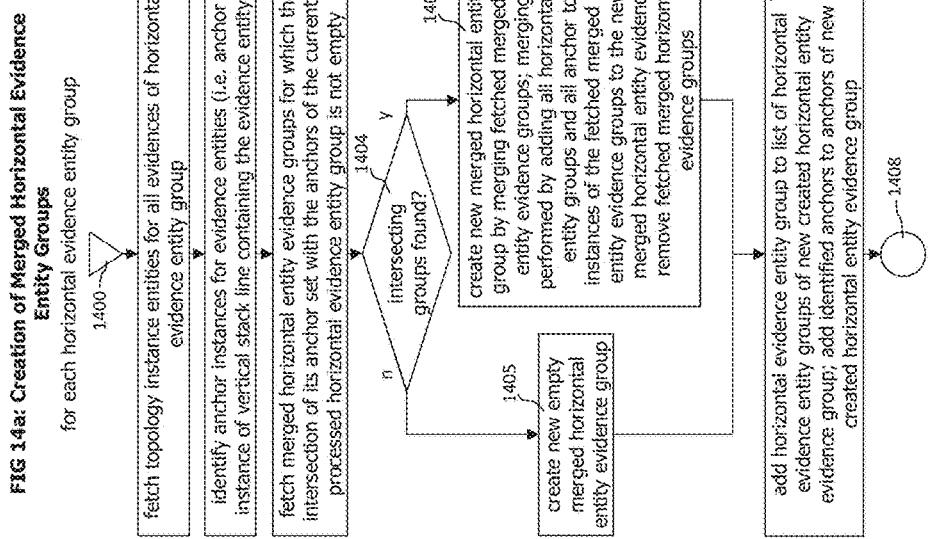

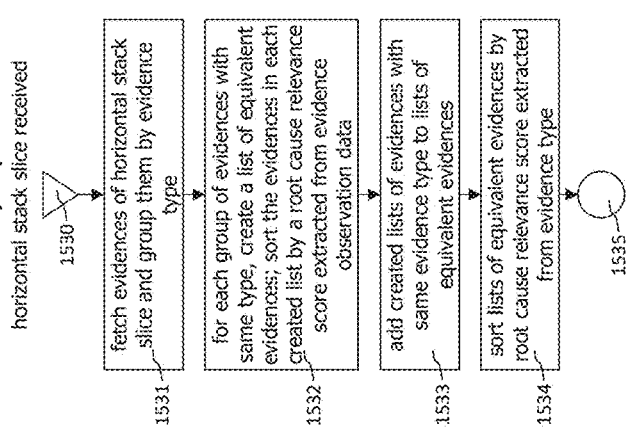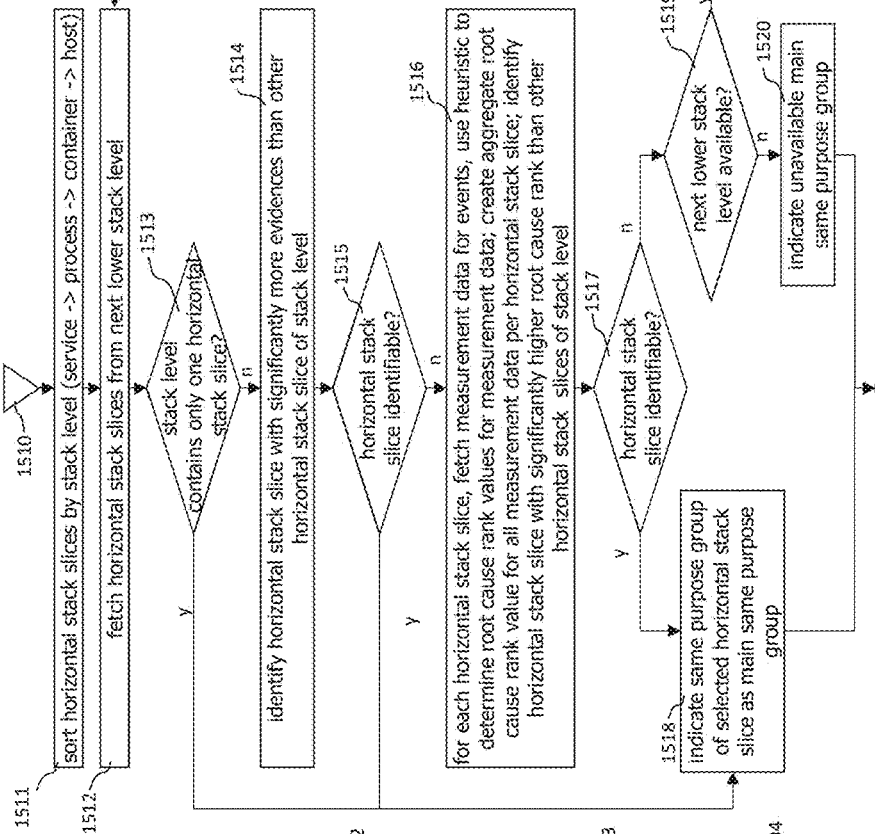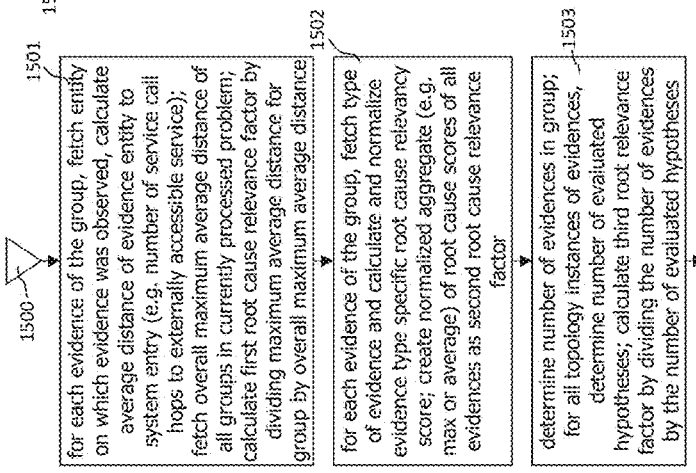

FIG 16a: Visualization of Root Cause Group

FIG 16b: Root Cause Relevance Ranked Equivalent Evidences for Root Cause Group

FORMING ROOT CAUSE GROUPS OF INCIDENTS IN CLUSTERED DISTRIBUTED SYSTEM THROUGH HORIZONTAL AND VERTICAL AGGREGATION

CROSS-REFERENCE TO RELATED APPLICATION

This application claims the benefit of U.S. Provisional Application No. 62/907,858, filed on Sep. 30, 2019. The entire disclosure of the above application is incorporated herein by reference.

FIELD

The invention generally relates to the field of automated grouping of identified, causal related abnormal operating conditions observed on a monitored environment and more specifically to the grouping of abnormal operating conditions that are connected via shared resources for which components on which the abnormal operating conditions are observed are competing, combined with a grouping of abnormal operating conditions that are connected via the same activity or code that is executed by components on which the abnormal operating conditions are observed.

BACKGROUND

The importance of application performance monitoring has constantly increased over time, as even short and minor performance degradations or application outages can cause substantial losses of revenue for organizations operating those applications. Service-oriented application architectures that build complex applications by a network of loosely connected, interacting services provide great flexibility to application developers. In addition, virtualization technologies provide more flexibility, load adaptive assignment of hardware resources to applications. As those techniques increase flexibility and scalability of the applications which enables a more agile reaction of application developers and operators to changed requirements, this also increases complexity and dynamic of application architectures and application execution environments.

In such complex and highly interconnected environments, it is vital to not only identify and localize abnormal operating conditions which may have adverse effects on the functionality of a monitored application Also the causal relationships between different abnormal operating conditions need to be identified to provide information for fast and efficient countermeasures.

Existing approaches detect abnormal operating conditions, use topology data specifying connections of components on which abnormal operating conditions are observed and data describing the abnormal operating conditions, together with heuristics to identify causal dependencies between the abnormal operating conditions, to create a data structure describing the causally related abnormal operating conditions, e.g. in form of a graph. In a next step, abnormal operating conditions are identified that most probably are the root cause of all other identified, causally related abnormal operating conditions.

U.S. Pat. No. 10,083,073 "Method and System for Real-Time Causality and Root Cause Determination of Transaction and Infrastructure related Events provided by Multiple, Heterogeneous Agents" by O. Ertl et al describes a system that analyzes pairs of abnormal operating conditions to estimate their causal dependency to incrementally create graphs of causally dependent abnormal operating conditions. The identified graph of causally depending abnormal operating conditions is then analyzed to identify those abnormal operating conditions with the highest probability of being the root cause of all other abnormal operating conditions in the graph.

U.S. patent application Ser. No. 16/519,428 "Method And System For Automatic Real-Time Causality Analysis Of End User Impacting System Anomalies Using Causality Rules And Topological Understanding Of The System To Effectively Filter Relevant Monitoring Data" by. E. Ambichl et al. describes a system that performs active identification of abnormal operating conditions only on a subset of the monitored environment. Identified abnormal operating conditions are then used as trigger events that initiate a rule-based, recursive search for other observed changes in the monitored environment that may have directly or indirectly caused the trigger event. The result of this recursive search is also a graph of causally dependent operating conditions on which further analyses may be performed to identify abnormal operating conditions that may be the root cause for the other abnormal operating conditions in the graph.

Although these approaches are capable to identify causal relationships quite accurate, and the result of a root cause estimation provides usable results for small to medium environments, they tend to fail for large environments in which typically large sets of causally related abnormal operating conditions are detected, because it is either impossible to identify root cause candidates directly for such large graph structures, or the set of identified root cause candidates itself is too large to perform required downstream analysis in a timely manner to e.g. implement appropriate countermeasures.

Consequently, a system and method are desired in the art that overcomes above limitations.

This section provides background information related to the present disclosure which is not necessarily prior art.

SUMMARY

This section provides a general summary of the disclosure, and is not a comprehensive disclosure of its full scope or all of its features.

The disclosed technology is directed to a focused and directed identification of causal dependencies between identified and localized abnormal operating conditions on a monitored system comprising in software and hardware components. A heterogeneous set of monitoring agents is deployed to components of the monitored system that provide monitoring data describing the operating conditions of monitored components. In addition, the disclosed technology provides application programmable interfaces (APIs) complementary to deployed agents which may be used by components of the monitored system to provide additional monitoring data.

The monitoring data may contain topology-related data describing structural aspects of the monitored system, resource utilization data describing the usage of resources like CPU cycles, memory (main memory and secondary memory), transaction trace data describing the execution of transactions executed by the monitored system, log data describing the operating conditions of monitored components in textual form, change event data describing changes of the monitored environment, as e.g. the update of software or hardware components of the monitored environment, including the change of operating system kernel versions, change of software libraries, or in case the monitored environment is fully or partially executed in a cloud computing environment, data describing changes of the cloud computing environment.

The topology-related data may contain but is not limited to data describing virtualization infrastructure used by the monitored system, like virtualization management components and the virtualized host computing systems provided by those virtualization management components, host computing systems including virtualized and non-virtualized host computing systems, container management systems executed on host computing systems, containers executed on those host computing systems and managed by the container management systems and processes executed in those containers, the processes executed on those host computing systems and the services provided by those hosts. In addition, the topology-related data may include data describing relations between components of the monitored environment, including vertical relations e.g. describing the processes executed by specific host computing systems or the virtualized host computing system provided by specific virtualization management components and horizontal relations describing e.g. monitored communication activities between components of the monitored environment. The monitoring system may integrate received topology-related data into a unified topology model of the monitored environment.

The topology model may consist in an instance layer, which describes individual elements of the monitored system, like host computing systems, processes executing on those host computing systems and services provided by those processes. The instance elements of the topology model may be arranged in a stack like manner, where elements on a specific stack level are based on elements of the next lower stack level and compete for resources provided by the element on the next lower level. As an example, processes executed by on a host computing system may be situated in a process stack level and the host computing system on which the processes are executed may be situated in a host stack level. The processes executing on the host compete for the resource (memory, CPU cycles, 10 etc.) provided by the host computing system. It is noteworthy that the topology model may use an abstraction for processes executed by host computing systems to keep the topology model stable. Processes may crash or may be shut down and then they may be restarted again. From a host computing system/operating system perspective, the process before and after the restart are different entities, as from the operating system perspective, there is no relation between the process before and after the restart, and both processes are assigned different identification data (process identifier or PID). From a logical, topological point of view, both processes are identical because they perform the same task and execute the same code. Therefore, the topology model does not track processes on a host computing system/operating system level, but on a logical level. A restart of a process does not change the topology model of a monitored application. However, the restart may be monitored and reported in form of availability measurement data for the (logical) process represented in the topology model. If not otherwise stated, the term "process" refers to a "logical" process as represented in the topology model.

Next to the instance layer, the topology model may also contain a "same purpose" layer, which groups elements of the topology that serve the same purpose and e.g. execute the same code. Examples for "same purpose" groups are services provided by different processes and e.g. accessible via different network endpoints that provide the same functionality, e.g. by executing the same code. Such sets of different services are typically desired to improve the throughput of a service by distributing the load caused by the execution of the service to different processes/host computing systems. Other examples for "same purpose" groups include processes started with the same or a similar command line which indicates that the processes execute the same code, instances of containers providing operating system level process isolation (like e.g. provided by the Docker environment) based on the same container image or virtualized host computer system that are based on the same virtualization image.

Information about resource provisioning/consumption relations between topology elements and about groups of topology elements serving the same purpose may be used for the grouping of identified, causally related abnormal operating conditions.

Other received monitoring data, like resource utilization data, transaction trace data, log data or change event data may contain topology localization data that identifies a location in the topology model (e.g. elements of the topology model that describe a process or a host computing system for resource utilization data, a process for log data, one or more services provided by one or more processes for transaction trace data, or various elements of the topology model affected by a change event) that corresponds to the monitoring data.

Received transaction trace data may be analyzed to extract measurement data describing performance and functionality of the monitored transaction executions. The temporal development of a selected set of those measurements may be monitored in detail (e.g. by using automated baseline value calculation mechanisms) to identify abnormal operating conditions of transactions, like increased transaction response times or failure rates. As transaction trace data also contains topology location data, a location in the instance layer of topology model can be assigned to those identified abnormal operation conditions. Besides transaction related measures, also non-transaction related measures, like measured describing the resource consumption of processes or host computing systems, measures describing the availability of components of the monitoring system or measures describing communication activities between components of the monitored system may be analyzed to identify unexpected and abnormal changes.

The identified abnormal operating conditions may trigger a recursive search for other abnormal operating conditions that are observed in the monitored environment that may have directly or indirectly caused the first identified abnormal operating condition to identify a set of causally related abnormal operating conditions. Identified abnormal operating conditions may also be referred herein as evidences.

Variant embodiments may use other mechanisms to identify sets of causally related abnormal operating conditions that are observed on the monitored environment, as long as the identified evidences can be localized in the instance layer of the topology model.

The identified, causally related abnormal operating conditions may in a next step be grouped according to their resource and code execution dependencies. The resource dependency grouping may be performed by identifying evidences that occurred on the same vertical topology instance stack. As example, evidences that occurred on a process may be assigned to the same vertical or resource dependency group as evidences that occurred on the host computing system on which the process is executed. A specific stack level may be defined as separating stack level for the vertical grouping for which all evidences that are located above the stack level may be assigned to exactly one vertical group and evidences that are locate below the stack level may be assigned to multiple vertical groups. As an example, the process or process group stack level of the topology model may be selected as separating stack level. Consequently, all evidences that occurred on a specific process may be assigned to a vertical group for the process. All evidences that occurred on services provided by the process may also be added to the vertical group for the process, and all evidences for the host operating system on which the process is running may also be added to the vertical group of the process. However, in case evidences occur on another process executed by the host computing system, these evidences will cause the creation of separate vertical groups containing the evidences that occurred on those processes and on the services provided by each process. The evidences observed on the host computing system executing the process (and in case the host computing system is virtualized, also all evidences observed on the virtualization components that are involved in the provision of the virtualized host computing system) are added to the vertical groups of all processes executed on the host computing system. In case a vertical group contains evidences on a topology entity of the separating stack level, this entity is selected as "anchor entity" or "anchor instance" of the vertical group. For vertical groups that only contain evidences that are located on topology entities below the separating stack level, the topology entity with the highest topology stack level on which an evidence of the vertical group occurred is selected as "anchor entity". Identified "anchor entities" may be in subsequent evidence grouping steps.

A second, independent grouping of evidences is performed according to the functionality performed by the topology entities on which the evidences are observed. This second, horizontal grouping uses the "same purpose" layer of the topology model, which groups those topology entities that provide the same functionality. Evidences that are observed on different entities of the same "same purpose" group may be grouped together.

In a subsequent step, horizontal and vertical groups may be analyzed to identify and combine horizontal and vertical groups that are linked by a shared topology entity. E.g. in case a horizontal group contains an evidence that was observed on a specific service and a horizontal group also contains an evidence that was observed on that service, the horizontal and the vertical group may be combined into one group.

Afterwards, the combined groups may further be merged by identifying combined groups that share at least one "anchor entity". As an example, two horizontal groups may contain service instances belonging to two different "same purpose" groups and at least one service instance of first "same purpose" group and one service instance of the second "same purpose" group are provided by the same process. Those two horizontal groups may be combined in the merging step.

The result of those grouping and merging processes are root cause groups of causal related evidences that are in addition connected shared resource and same code/same functionality relationships.

In a subsequent step, the identified root cause groups may be analyzed to determine a root cause relevance rank for each group, and the evidences contained in the root cause groups may be grouped to form groups of equivalent evidences. Those groups of equivalent evidences may then, on a per root cause group-level, be ranked according to their root cause relevance.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 1 provides a block diagram of an agent-based monitoring system that captures structural and activity data of the monitored system and uses the captured data to identify and group causally related abnormal operating conditions.

FIGS. 2a-2c show data records that may be used to transfer different types of monitoring data from agents deployed to a monitored environment to a monitoring server for analysis.

FIGS. 3a-3f describe data records that may be used by a monitoring server to store a topological model data, transaction trace data and time series data.

FIGS. 4a-4c describe the processing of incoming monitoring data, like topology, transaction trace and measurement data by a monitoring server.

FIG. 5 provide an exemplary topology model containing both instance layer and the "same purpose" layer data of topology entities.

FIGS. 6a-6b provides flow charts of two alternative methods to identify sets of causally related abnormal operating conditions from topology, transaction trace and time series data received from agents deployed to a monitored system.

FIGS. 7a-7d shows variants of evidence groups in different merging stages.

FIG. 8 shows an exemplary set of causally related abnormal operating conditions and their location within the topology model of a monitored environment.

FIG. 9 provides a flow chart of the overall process of identifying abnormal operating conditions in a monitored environment, detecting causal relationships between the abnormal operating conditions, followed by a grouping of the abnormal operating conditions according to shared resource and shared code relations and a ranking of identified root cause groups according to a root a root cause rank derived from the evidences contained in the identified root cause groups.

FIGS. 10a-10i shows data structures that may be used for the identification and ranking of root cause groups and for the identification and ranking of equivalent evidences.

FIGS. 11a-11c show flow charts that describe the forming of horizontal and vertical evidence groups.

FIG. 12 shows exemplary vertical evidence groups in a topology model.

FIG. 13 shows exemplary horizontal evidence groups in a topology model.

FIGS. 14a-14d provide flow charts of processes to perform different merging steps of identified evidence groups to form root cause groups.

FIGS. 15a-15c show flow charts of processes to calculate root cause ranks, to identify a most important topology entity and to identify and rank equivalent evidences for identified root cause groups FIGS. 16a-16b provide screenshots for exemplary visualizations for identified root cause groups.

DETAILED DESCRIPTION

Example embodiments will now be described more fully with reference to the accompanying drawings.

The present technology provides a comprehensive approach to integrate various types of monitoring data describing static and dynamic aspects of a distributed computer system into a model that allows the focused and directed identification of relevant abnormal operating conditions and the search for other, corresponding abnormal operating conditions that are causally related with the relevant abnormal operating conditions.

Portions of the monitoring data are used to create a living, multi-dimensional topology model of the monitored environment that describes communication and structure-based relations of the monitored environment. The created topological model contains data to identify components of the monitored environment that serve the same purpose, like processes executing the same code, that may also process requests of the same type, containers providing operating system level process isolation, like e.g. docker containers that are based on the same container image and therefore execute the same processes or virtual operating systems that are based on the same virtual operating system images and therefore provide operating systems with the same resources and functionalities. In addition, the topological model also describes resource provision and usage dependencies, like processes that utilize resources provided by the operating system which executes them.

Other portions of the monitoring data, describing transaction executions performed on the monitored environment, may be used to monitor performance and functionality of services provided by the monitored environment and used by the executed transaction. This monitoring data may be continuously analyzed to identify abnormal operating conditions. Still another portion of the monitoring data may be used to describe resource utilization, availability and communication activities of elements of the monitored environment.

Identified transaction execution related anomalies are located on a topology element, and the connection data of the topology model may be used to identify topology entities that are related to the location. Monitoring data corresponding to those identified topology entities may then be used in a detailed and focused analysis to identify other unexpected operation conditions that are in a causal relationship with the first identified transaction related abnormal operating condition.

The result of such analyses typically consists of sets of identified abnormal operating conditions that are causally related. Some embodiments may in addition identify causal directions between events in form of cause and effect relations. Those embodiments may provide directed graphs of abnormal operating conditions, where the nodes of the graph identify abnormal operating conditions and the edges between the nodes represent causal relationships.

After sets of causal related abnormal operating conditions are identified, the next goal is to identify one or more root cause conditions that caused all other causal related abnormal operating conditions, as due to their causal relationships, fixing those root cause abnormal operating conditions most probably also fixes all other causally related abnormal operating conditions.

It can be observed in most modern application environments, that the same functionality or code is deployed to multiple components like processes, containers or host computer systems, e.g. to improve the fault-tolerance and/or the performance of the system, to e.g. tolerate the crash of one or more computer systems and/or to be able to handle more load than a single system can do. Consequently, multiple processes, containers or host computer systems of such an application environment are serving the same purpose and are typically also executing the same code. This establishes a horizontal "same purpose" relationship between those components, which can be exploited for the root cause analysis.

In addition, monitoring data potentially describing abnormal operating conditions is provided by agents that monitor an environment on different levels, like an operating system, container, process or service level. In case an abnormal operating condition is observed on one level, it may also be visible on another. As an example, an abnormal operating condition may show an increased memory consumption of a specific process. In addition, also increased memory consumption may be registered on the operating system executing the process. This demonstrates a second, vertical relationship between components that is caused by a "shared resource" or resource provision/consumption relationship which may also be used during root cause analysis.

Those identified vertical and horizontal relationships may be combined with the assumption that execution of application level code is more likely causing abnormal operating conditions than being affected from one, to create a root cause grouping and ranking system. Consequently, observed abnormal operating conditions that correspond to application specific code are a assigned higher root cause probability than observed abnormal operating conditions that correspond to operating system code.

Coming now to FIG. 1, which provides a flow chart of a monitoring system that uses above described ideas to identify groups of abnormal operating conditions that describe the same symptom by using vertical and horizontal relationships, and that further ranks the identified root cause groups according to a root cause rank derived from the abnormal operating conditions contained in the individual root cause groups.

Agents and APIs 102 are deployed to a monitored environment to gather monitoring data. Agents typically create monitoring data actively, by e.g. monitoring transaction executions performed in the monitored environment, monitoring occurred resource consumptions or monitoring the structure of the monitored environment. APIs are interfaces provided by the monitoring system which may be used by components of the monitored environment to push various types of monitoring data into the monitoring system.

The monitoring data generated or received by the agents/APIs 102 deployed to the monitored environment 101 is transferred to a monitoring server 110 via a connecting computer network (not shown) in form of scalar measurement records 103, transaction records 104 or topology records 105. Scalar measurement records 103 may be used to transfer resource consumption measurement data, transaction records 104 may be used to transfer transaction trace data describing portions of monitored transaction executions and topology records may be used to transfer data describing portions of the topology of the monitored environment.

Scalar measurement records 103 are received by a scalar measurement processor 111, which incrementally creates corresponding time series data and stores 112 it in a measurement repository 113 for further visualization and analysis. Transaction records 104 are received by a transaction trace data processor 115 which incrementally creates end-to-end transaction trace records describing individual transaction executions that may cross thread, process and operating system borders. Completed end-to-end transaction trace records are stored 116 in a transaction repository 117 for further analysis. Topology records 105 are received and processed by a topology data processor 123. The topology records 105 contain data identifying and describing individual components of the monitored environment, including but not limited to services, processes, containers, operating systems and virtual or physical host computing systems. The topology records also contain data describing structural dependencies of the components, like e.g. data describing which processes or containers are executed by which operating systems or which processes provide which services, and data describing communication activities of the components, like e.g. which processes on which operating systems communicate via which ports. This data is used to create the instance layer 126 of the topology model, which describes individual topology components and their relationships. In addition, the topology records may contain data describing and discriminating the functionality of different components of the monitored system. Examples of such data may contain but are not limited to command lines used to start processes, identifiers of container images used to start containers or identifiers of virtualization images used to start virtualized computer systems. This data may be used by the topology data processor 123 to create a same purpose layer 125 of the topology model. The same purpose layer of the topology groups individual components of the topology that server the same purpose, like processes that are started with the same or a similar command line, as processes that are started with the same command line most probably serve the same purpose. Those processes may be executed on different operating systems and host computing systems.

End-to-end transaction trace data stored in the transaction repository 117 may be analyzed 118 by a transaction/service measurement extractor 119 to extract measurement data from end-to-end transaction traces and to create and store 120 time series data for similar or equivalent end-to-end transaction traces in a measurement repository. The created time series data may e.g. describe for a sequence of end-to-end transaction traces that were executed over time, the response times of the transactions or of specific services used by those transactions.

The stored end-to-end transaction traces are also analyzed 119 by a service topology extractor 121 which identifies services used by individual end-to-end transaction traces that are provided by specific processes. Typically, the execution of end-to-end transactions involves multiple processes which communicate with each other to fulfill the transaction. This communication uses services provided by the processes, which represent "entry points" into the processes. Although the end-to-end transaction traces also describe process internal execution of the transactions, the service topology extractor 121 only extracts service calls performed by those transactions and adds data describing the called services to the instance layer 126 of the topology model. This may include adding components describing those services to the topology model and assigning the services to the topology components representing the processes that provide those services. In addition, the service topology extractor 121 may identify service call dependencies and enrich the instance layer of the topology model with data describing those call dependencies. As a simple example, a transaction may call service "A". To fulfill its purpose, service "A" may internally call service "B". This describes a call dependency from service "A" to service "B" which may be represented in the instance layer of the topology model. In addition to service instances, the service topology extractor 121 may also identify services of the same purpose and add them to the same purpose layer 125 of the topology. As an example, services may be accessible via remote method (RMI) call interfaces, or via HTTP. For the RMI case, services of the same purpose may be identified by the signature (method name, parameter types and return type) of the RMI method and RMI methods having the same signature but being provided by different processes on different host computing systems may be added to the same "same purpose group". Similarly, HTTP based services may be specified by a server name, a path and query parameter keys. HTTP services provided by processes on different hosts (or via different ports) that share the same path and query parameter keys may be added to the same "same purpose group".

An anomaly detection/causality estimation module 130 permanently monitors the instance layer of the topology model 126, the transaction repository 117 and the measurement repository 113 to identify abnormal operating conditions and to further identify causal relationships between multiple abnormal operating conditions. Identified abnormal operating conditions may also be referred to as evidences. Evidences may contain but are not limited to a type describing what type of change occurred (e.g. CPU usage increase), an amount (e.g. percentage of CPU usage increase), a topology location (e.g. on which process or host computing system was the increase observed) and temporal data (i.e. when was the increase first observed and how long did it last).

The output of the anomaly detection/causality estimation module 130 may be graphs of causally related evidences 131. Typically, the anomaly detection/causality estimation module may create a directed graph that connects causally related evidences that also describes how causal effects travel between different evidences over topology entities. The subsequent root cause aggregation processing does not require such a causality graph. The minimal requirement for the root cause aggregation processing is a set of evidences for which direct or indirect causal relationships were identified.

The created causality graph 131 may be forwarded 132 to a root cause aggregator 133, containing a horizontal aggregator 134 and a vertical aggregator 135.

The horizontal aggregator 134 analyzes the topology location of received evidences in conjunction with the same purpose layer 125 of the topology model to identify and group those evidences that occurred on topology entities that serve the same purpose. The horizontal evidence groups 138 identified by the horizontal aggregator may e.g. include evidences that were observed on different processes that were started with the same a similar command line on different host computing systems. Horizontal groups may also be referred to as shared code groups, as the grouped evidences typically occurred on topology entities that execute the same code.

The vertical aggregator 135 analyzes the topology location of the received evidences to identify groups of evidences that happened on topology entities that are in a resource sharing or a resource provision/consumption relationship. The vertical aggregator 135 may access the instance layer 126 of the topology model for this analysis. A typical example for a vertical evidence group 139 identified by the vertical aggregator are CPU usage evidences that were observed on a process and on the host computing system that executes the process. Vertical groups may also be referred to as shared resource groups as they typically group evidences that are related via a resource sharing or a resource provision/consumption relationship.

Vertical evidence groups 139 and horizontal evidence groups 138 are forwarded to a root cause group merger module 140, which identifies and merges those vertical and horizontal evidence groups that share a topological entity to create merged root cause groups 142. As an example, a merged root cause group may be created from a horizontal group consisting of evidences that occurred on process 1, process 2 and process 3 and a vertical group containing evidences that occurred on process 2, container 1 executing process 2 and host computing system 2 executing container 1. Both groups may be merged because at least one evidence of each group was observed on the same topology entity, which is process 2.

The merged root cause groups 142 may be forwarded to a root cause group ranker 143, which may analyze the received merged root cause groups to calculate a root cause rank for each merged root cause groups. The root cause group ranker may use evidence data of the received merged root cause group, together with topology data and heuristics to calculate the root cause rank.

The ranked and prioritized merged root cause groups 145 may then be forwarded 144 for further visualization, storage and analysis.

Coming now to FIGS. 2a-2c which shows various data records that may be used to transfer monitoring data from agents/APIs 102 to the monitoring server 110. A transaction record 200 as shown in FIG. 2a may be used to transfer transaction execution monitoring data describing a portion of a monitored distributed transaction that was executed by a single process. Transaction records 200 may be generated by agents that are injected to individual processes and may describe the portion of the execution of a monitored transaction that was executed locally on the process into which the agent is injected. Transaction records 200 may contain but are not limited to a topology identifier 201 which identifies the process on which the transaction portion was monitored in the instance layer 126 of the topological model of the monitored application, incoming service data 202, describing the incoming call or request received by the process that triggered the execution of the transaction on the process, outgoing service data 203 describing the outgoing calls performed by the process during the execution of the transaction to e.g. request the execution of services provided by other processes, correlation data 204, containing data identifying the current transaction execution portion and the transaction execution portion that triggered the execution of the current transaction portion, e.g. in form of a current identifier and a parent identifier, and transaction performance measurement data 205, describing the activities performed on the local process to execute the monitored transaction, e.g. in form of data describing method executions containing start and end time of the method execution, method call parameter values and return values or CPU and memory usage caused by the method executions.

FIG. 2b shows a topology record 220 which may be used to transfer topology data acquired by agents 102 deployed to a monitored environment 101 to a monitoring server 110. Topology records may be used to transfer topology data describing portions of the monitored environment from agents deployed to the monitored environment to a monitoring server. The topology data describes structural aspects of the monitored environment, like host computing systems contained in the monitored environment, processes executing on those host computing systems, services provided by the processes, hypervisors running in the monitored environment and virtual host computing systems provided by those hypervisors. The topology data also describes communication activities performed by processes of the monitored environment.

A topology record 220 may contain but is not limited to a topology identifier 221 which identifies the component of the monitored environment that is described by the topology record in the instance layer 126 of the topology model, same purpose group data 222, which may be used to identify groups of topology elements that serve the same purpose by e.g. executing the same code and/or the same configuration data, a time stamp 223 specifying the point in time when the data for the topology record was acquired by an agent, a parent topology identifier 224 identifying the parent topology entity for the topology entity described by the topology record, like e.g. the topology identifier for the host computing system executing the process that is described by the topology record, entity instance 255 and entity type 226 descriptive data, status update data 227 describing the current state of the component described by the topology record and entity communication data describing communication activities performed by the component described by the topology record.

A topology identifier 221 uniquely identifies a component of the monitored environment, like a host computing system or a process. Components that are physically different but are equal on a logical level should map to the same topology identifier. Examples of such components that are different on a physical level but are logically equivalent are multiple, consecutive executions of the same process image on an operating system. Each restart of the process creates new data records representing the process on the hosting computer system and each of those records may be identified by a different process identifier (PID), but the code executed by the process, and the configuration data used to configure the process remains the same. Therefore, subsequent executions of the same process image by the same host computing system may be assigned the same topology identifier. As an example, the topology identifier for a host computing system may be created by calculating a hash value for the network address of the host computing system. The topology identifier for a process may be created by e.g. combining the network address of the host computing system that executes the process and the command line used to start the process and then calculate a hash value for this combined data.

Same purpose group data 222 contains data that may be used to identify topology entities that serve the same purpose. Simple examples for such same purpose group data includes for processes a hash generated from the command line of the process (without combining it with the network address of the host executing the process), or an identifier for a container image used to start a container (without data identifying the host computing system that executes the container). Processes that are started with the same command line, on different host computing systems may be assigned different topology identifiers 221 and represented by different topology elements on the instance layer 126 of the topology model, but they may be assigned the identical same purpose group data 222 indicating that those processes server the same purpose, even if they are executed on different host computing systems. Similar conditions apply to containers executing on different host computing systems but using the same container image.

A more elaborate same purpose identification may, for processes that do not start with the same, but similar command lines that e.g. only differ in the config file used to start the processes, further analyze those config files and in case those config files only differ in the way how the functionality provided by the starting processes is accessible (e.g. different port numbers to receive requests) and not in the way the functionality itself is configured, create identical same purpose data.

Measurement records 210, as shown in FIG. 2c may be used to transfer measurement data acquired by agents to a monitoring server. Typically, agents may cyclically acquire e.g. resource utilization data like CPU, memory, disk or network usage from components they are deployed to and send this measurement data to a monitoring server in form of measurement records. A measurement record 210 may contain but is not limited to a topology identifier 211, identifying the topology entity on which the measurement was performed, a measurement type 212, determining the type of measurement that was performed like e.g. CPU, memory, disk or network usage, a time stamp 213 specifying the point in time when the measurement was performed and a value 214 containing the actual measurement value.

Coming now to FIGS. 3a-3f which describes various data records that may be used by the monitoring server to store end-to-end transaction trace data, topology mode data and measurement data in form of time series. The monitoring server may herein also be referred to as monitoring node. Multiple monitoring servers/monitoring nodes may be combined into a monitoring server cluster that collectively receives and processes monitoring data to increase the capacity of a monitoring system.

Processing trace node records 300, as shown in FIG. 3a, may be used to store data describing transaction related activities that are performed by a specific process in response to the receipt of a request to perform a portion of a distributed transaction. A processing trace node record 300 may contain but is not limited to a topology identifier 301, identifying the process on which the activities were performed in the instance layer 126 of the topology model, correlation data 302, containing data to identify the current processing trace node record, and to identify the processing trace node containing activities that caused the activities described by the current processing trace node (parent processing trace node), incoming service call data 310, describing and identifying the service which was used on the process on which the activities described by the process trace node were performed to receive the request that triggered the activities, outgoing service call data 320, describing the service calls performed during the activities described by the process trace node to request services from other processes and payload data 324, which describes the process local activities in for of e.g. sequential or nested method calls, containing data describing performance and resource utilization of individual method calls, like method start and end, amount of memory allocated during method execution or CPU usage caused by individual method executions, and data describing the values of parameters or return values of individual method executions.

The service call detail data 311 section of incoming service data 310 of processing trace nodes, may provide data describing and identifying a service call received by a process and may contain but is not limited to a type of the called service, like e.g. HTTP or remote method call service, and data describing the specific performed service call. For HTTP based services it may e.g. contain the received HTTP request, including query string if available. For remote method call services, service call detail data may contain data identifying the remotely called method and values of parameters used for the remote method call. Service call detail data 311 may in addition contain a service topology identifier 312, which identifies the called service in the instance layer 126 of the topology model.

Outgoing service call data 320 may be part of process trace nodes 300 and may be used to describe outgoing calls performed during the process-local execution of a portion of a distributed transaction. Outgoing service call data may contain multiple service call detail data records 322, describing and identifying different outgoing service calls. Service call detail data records 322 of outgoing service call data 320 may contain data describing outgoing service calls in a similar quality as the service call data detail data record 311 of the incoming service call data section 310. In addition, each service call detail data record 321 may contain but is not limited to a service topology identifier 322 which identifies the called service in the instance layer 126 of the topology model, and call context data 323, which describes the performed outgoing call in detail and may contain e.g. parameter values of the service call and the position of the outgoing service call in the method call graph which describes process local activities that led to the outgoing service call.

Trace communication node records 330 as described in FIG. 3b may be used to describe service calls performed by monitored distributed transactions and to link process trace node records describing portions of monitored distributed transactions that are connected via service calls. A trace communication node record links the service call detail data of an outgoing service call 320 of a processing trace node with the service call detail data of the incoming service call 310 of the processing trace node that describes the processing of the service call. Transaction communication node records 330 may contain but are not limited to sender data 331 describing the origin of a service call, e.g. by identifying the processing trace node 300 and the method call within the processing call node 300 that caused the service call, and receiver data 335, which describes the receiver of the service call, e.g. in form of an identifier of the process trace node 300 that describes the processing of the service call. Sender data 331 may contain but is not limited to correlation data 332, identifying the processing trace node 300 containing the method call that caused the service call, a service topology identifier 333, identifying the called service in the instance level of the topology model, and call context data 334 containing data further describing the service call, like call parameter values or the position of the method that caused the service call in the method call tree of the processing trace node identified by the correlation data.

Receiver data 335 may contain but is not limited to correlation data 336, identifying the processing trace node 300 which describes the processing of the service call, and a service topology identifier 337, identifying the called service in the instance level of the topology model. Note that both sender data 331 and receiver data 335 may contain a service topology identifier 333 and 337 to e.g. cover the case of a service call directed to a receiver for which only topology monitoring but no transaction monitoring is possible. In such a case, receiver data 335 would be missing, but as also the sender data 331 contains a service topology identifier for the receiver, it is still possible to locate the called service in the instance layer of the topology model.

Topology instance node records 340 may be used to represent various components in the instance layer of the topology model of a monitored environment. Such represented components include but are not limited to, hypervisors which manage resources like CPU cycles, main and disk memory, network connection and bandwidth access to run virtualized computing system, concrete and virtualized computing systems, cloud specific computing components like e.g. dedicated load balancing or storage components provided by cloud vendors, containers executed on concrete and virtualized host computing system to provide isolated views on the resources of the host computing system, processes executing either in containers or directly on host computing systems, services provided by those processes which may be used to execute distributed transactions and network infrastructure components, like proxies or load balancers.

Topology instance node records 340 may contain but are not limited to a topology identifier 341, which uniquely identifies a component in the monitored environment and the topology instance node representing this component in the instance layer of the topology, a parent topology identifier 342 identifying the topology instance node representing the component that runs, provides or contains the component represented by the current topology instance node record, topology type data 343 describing the type of the represented component, exemplary topology types include but are not limited to hypervisor, host computing system, proxy, load balancer, container, process, service, HTTP service, remote method call service, data base service etc., a same purpose group identifier 344 which may be used to group topology instance nodes that serve the same purpose, and instance descriptive data 345 containing data which further describes the represented component.

Topology same purpose group node records 350, as described in FIG. 3*d*, may be used to represent multiple topology instance nodes that server the same purpose. As an example, topology instance nodes 340 representing processes that may run on different host computing systems but that were started using the same command line, may be identified as topology instance node records representing components that serve the same purpose.

Topology same purpose group node records 350 may contain but are not limited to a same purpose group identifier 351, that may be derived from same purpose group data 222 received with topology records 220 and that uniquely identifies a same purpose group node record, topology type information specifying the type of the topology instance nodes that are represented by the topology same purpose group node record and type descriptive data 353 further describing the topology entities represented by the topology same purpose group node records 350.

A topology communication node 360 as shown in FIG. 3*e*, may be used to represent a monitored communication activity between topology entities. Such monitored communication may be directed, and the communicating topology entities may play different roles in the communication, like client and server or sender and receiver, and the communication may use specific a specific protocol to transmit data.

A topology communication node 360 may contain but is not limited to a client topology 361 identifier which identifies the topology instance node 340 representing the component of the monitored environment that plays the client or sender role in the communication, a server topology identifier 362 identifying the topology entity representing the server or receiver of the communication activity and communication type data 363 identifying the protocol that was used to perform the communication.

Time series records 370, as shown in FIG. 3*f*, may be used to store measurement data in form of time series consisting of sequences of data points. A time series record 370 may contain but is not limited to a topology identifier 371 identifying the topology instance node 340 that represents the component of the monitored environment which is the origin of the measurement data stored in the time series record, a measurement type 372 identifying the type of the stored measurement data, like e.g. CPU usage, service response time, requests per time interval, and a data point list 373, containing a sequence of data point records 374, each data point record containing a time stamp 375 representing the point in time at which a measurement was performed, and a value 376 containing the result value of the performed measurement.

Coming now to FIGS. 4*a*-4*c* which provides flow charts of various processes that are performed by the monitoring server on receipt of different types of monitoring data provided by deployed agents.

FIG. 4*a* describes the processing of topology records 220, as e.g. performed by the topology data processor 123 of a monitoring server 110. The process starts with step 400 when a new topology record 220 is received by the topology data processor. Following step 401 fetches the topology instance node 340 corresponding to the received topology record 220 from the instance layer 126 of the topology model. Step 401 may e.g. query a topology instance node 341 that has a topology identifier 341 that is identical to the topology identifier 221 of the received topology record 220. Following decision step 402 checks whether such a topology instance node already exists in the instance layer of the topology model and, in case such a topology instance node already exists, continues with step 403, which updates the already existing topology instance node with data of the received topology record. This may include updating status data of the topology instance node.

Otherwise if no matching topology instance node is available, step 404 is executed which creates a new topology instance node 340 and initializes it using the data of the received topology record 220.

Following step 405, which is executed after step 403 or 404, updates the instance layer of the topology model with communication data contained in the received topology record, by analyzing the entity communication data 228 of the topology record and creating corresponding topology communication nodes 360 that describe the monitored communication activities in the instance layer of the topology model.

Subsequent step 406 afterwards sets or updates the vertical stack relationships of the created or updated topology instance node by setting its parent topology identifier 341 to the topology instance node 340 representing the component of the monitored environment that contains, executes or provides the component represented by the currently created or updated topology instance node. Examples for vertical stack relationships include relationships between processes and the containers or host computing systems in which the processes are executed, virtualized host computing systems and the hypervisors providing those virtualized host computing systems or services and the processes providing those services. The vertical stack relationships stored in the instance layer of the topology model link components that belong to the same vertical stack, like e.g. linking a service with the process providing the service, the process with the container running the process, the container with the virtualized host computing system running the container and the virtualized host computing system with the hypervisor providing the virtualized host computing system.

To reduce the complexity, software systems are typically built in a layered or stack like manner. Physical hardware forms the bottom of the stack, hardware related software components like e.g. BIOS provide interfaces to the hardware and hide the complexity of the hardware from higher layers using those interfaces. An operating system runs on the hardware, uses e.g. those BIOS interfaces to communicate with the hardware and provides interfaces to execute processes which again hide complexity of the underlying system. Processes in turn may e.g. run virtual machine environments, like the Oracle JAVA® to further reduce complexity and to hide differences between different types of host computing systems and operating systems. Application code may then be executed by those virtual machine environments. This application code may then provide services that may be called by application code running on different processes or host computing systems. Those components form a technology stack, where lower layers (physical hardware, BIOS) provide the foundations for higher layers (processes, virtual machines). In addition, components providing lower-layer functionality also manage resources and provide them for the usage by higher-layer components. As an example, operating systems manage resources like CPU cycles, main memory, persistent memory or network connection and provide those resources for processes running on them. Operating systems and processes running on those operating systems may be considered in a resource provision/usage relationship, where operating systems provide resources and processes consume them. Multiple processes that executed on the same operating system may be considered in a resource competing relationship as they compete for the limited resources provided by the operating system on which they are executed.

The parent topology identifiers 343 of topology instance nodes 340 may be used to model this technology stack dependencies in the instance layer of the topology model.

Step 407 afterwards fetches the same purpose group to which the currently created or updated topology instance node belongs from the same purpose group layer of the topology model. Step 407 may e.g. derive a same purpose group identifier from the same purpose group data 222 of the received topology record 220 and query the same purpose group layer 125 of the topology model for a topology same purpose group node with an identical same purpose group identifier 351. Same purpose group data 222 may, for processes include the command line that was used to start the process and for containers an identifier of the container image that was used to start the container. Deriving a same purpose group identifier from the same purpose data may include calculating a hash value for the same purpose group data.

Decision step 408 executes step 409 if a matching topology same purpose group node was found and step 410 otherwise.

Step 409 may update the already existing topology same purpose group node with data from the received topology record. Alternatively, step 410 may create a new topology same purpose group node 350 according to the data of the received topology record 220. Step 410 may set same purpose group identifier 351 of the created topology same purpose group node to the value previously calculated in step 407. Steps 409/410 may update or set topology type 352 and type descriptive data according to the data stored in the receive topology record.

Following step 411 creates a connection between the created or updated topology instance node and its corresponding topology same purpose group node. Step 411 may e.g. set or update the same purpose identifier 344 of the created or update topology instance node to the value calculated in step 407. The process then ends with step 412.

The processing of received measurement records 210 by the scalar measurement processor 111 is shown in FIG. 4b. The process starts with step 420, when a measurement record is received by the scalar measurement processor.

Following step 421 queries the time series repository 113 for a time series record 370 with a topology identifier 371 and a measurement type 372 that matches the corresponding values of the received measurement record 210. In case no matching time series record is found, a new one may be created and topology identifier 371 and measurement type of the created time series record may be set to topology identifier 211 and measurement type 212 of the received measurement record. The new created time series record may be added to the time series repository.

Following step 422 may extract time stamp and measurement value from the received measurement record and create a data point record 374 using the data extracted from the received measurement record. The created data record may then be added to the data point list 373 of the fetched or created time series record.

Following decision step 423 determines whether an adaptive reference value is required for the just updated time series. Adaptive reference values or base lines are values extracted from historic time series data that represent expected or normal value ranges for time series data. Those reference values may change over time with new received measurement values. The determination performed by step 423 may be based on the measurement type and/or topology related data. As an example, adaptive reference values may e.g. only be required for measurement types CPU or memory usage when those measurement describe CPU or memory usage of a process or container. The rules to identify time series for which adaptive reference values are required may be fixed or adaptable via user changeable configuration.

Various methods are known in the art to calculate such adaptive reference values including but not limited to the calculation or estimation of quantiles or sliding averages.

Step 424 is executed when decision step 423 determines that an adaptive reference value is required. Step 424 updates the reference value to also include the new received measurement data. The process then ends with step 425.

The processing of transaction records 200 by the transaction trace data processor 115 is shown in FIG. 4c. The process starts with step 430, when the transaction trace data processor receives a new transaction record and continues with step 431 which may first create a new processing trace node 300 using the data of the received transaction record and then use the correlation data 302 (taken from the correlation data 204 of the received transaction record) to identify other processing trace nodes already stored in the transaction repository 117 which are in a parent/child relationship with the new created processing trace node. Step 431 incrementally creates tree data structures of process trace nodes that are connected by trace communication nodes. Each of those trees represents a monitored end-to-end transaction. Following decision step 432 determines whether a new finished end-to-end transaction trace is available in the transaction repository. Step 432 may e.g. determine, for existing trees of connected process trace nodes, the point in time when the last transaction record that updated one of those trees was received. Trees for which this time is older than a specific threshold (e.g. 10 seconds, one or 5 minutes), may be considered as finished. Step 432 and following steps may either be executed on each received transaction record or they may be executed cyclically and asynchronous to the receipt of transaction records.

In case no finished end-to-end transaction trace was identified, the process ends with step 440. Otherwise, steps 433 to 440 are executed for each finished end-to-end transaction trace.

Following step 433 extracts service and service call dependencies from the finished end-to-end transaction trace, by e.g. first extracting service calls documented in incoming service call data 310 and outgoing service call data 320.

Subsequent step 434 uses the extracted service call data to update the instance and same purpose layer of the topology model accordingly. Step 434 may e.g. create or update a topology instance node for each service identified in the service call data extracted from the end-to-end transaction trace. The created topology instance nodes representing those services may then be vertically connected to the topology nodes representing the processes providing those services. The vertical connections may e.g. be performed by setting the parent topology identifiers 342 of the created topology instance nodes for identified services to the topology identifier of the process that provides those services. More precisely, step 434 may, e.g. for service topology entities derived from incoming service call data 310, set the parent topology identifier 342 of those topology entities to the topology identifier 301 of the processing trace node from which the service topology entity was extracted, as this topology identifier identifies the process on which the service was executed.

Step 434 may in addition create or update topology same purpose group nodes 350 for the created or updated service topology entities. Services that serve the same purpose may be identified by first analyzing the captured data describing the service requests. Service request data can, on a logical level, typically be split into three parts. The first part identifies a location on which the service is requested, like a network address combined with a port number, which identifies a process running on a host computing system. The second part identifies the service that should be executed on the receiver location, like e.g. a method signature for remote method calls or the path of an URL for HTTP based services. The third part specifies service call parameters, like e.g. parameter values for a remote method call or a query string for HTTP based services. Services that only differ in first and third part and that are identical in the second part, may considered as services that serve the same purpose and may therefore be assigned to the same topology same purpose group 350. In addition, the processes that provide services may be included in this determination and only services that are identified as serving the same purpose based on service call data that in addition are provided by processes that also share a same purpose group are considered as serving the same purpose.

Step 434 may also extract service call dependencies, describing nested service calls from end-to-end-transaction data and update the instance layer of the topology model with data describing those dependencies. As an example, end-to-end transaction trace data may contain a service call "A", and the processing trace node describing the execution of service "A" contains an outgoing service call to service "B", indicating that service "A" depends on service "B". The topology model may e.g. be updated by connecting the topology entities representing service "A" with the topology entity representing service "B" with a topology communication node 360 describing the call dependency between service "A" and service "B".

Following step 435 may extract service measurement data from the end-to-end trace data, including data describing service response times, memory or CPU allocation caused by specific services or error data describing error rates for specific services. Subsequent step 436 fetches or creates corresponding time series records for the measurement data extracted in step 435 as those time series records 370 with the same topology identifier 371 as the service from which the measurement data was extracted and with measurement types 372 corresponding to the types of extracted measurement data and following step 437 inserts the new received service measurement data to the data point lists 373 of the corresponding time series records 370.

Afterwards, steps 438 and 439 update adaptive reference values if required and the process then ends with step 440.

The adaptive reference values maintained in step 424 and 439 may later be used to identify unexpected operating conditions by e.g. comparing current measurement values with corresponding adaptive reference values and using current measurement values that are outside of expected value ranges as defined by adaptive reference values for at least a specific time period as indicators for unexpected operating conditions.

Coming now to FIG. 5, which describes an exemplary topology model including instance and same purpose layer data and service dependencies.

Entry service 1 500 of entry service same purpose group 1 501 receives incoming transaction requests and forwards 502 them to load balancing service 1 503 of load balancing same purpose group 1 504. Load balancing service 1 503 distributes 506, 507, 508 incoming transaction requests to front end services 1 510, 2 511 and 3 512. Those front-end services belong to the front-end same purpose group 1 514. For transactions routed to front end service 3 512, service calls 509 to front end service 4 513 of front-end same purpose group 2 515 are recognized.

Front end services 1, 2 and 3 are provided 517, 519, 520 by front end processes 1 524, 2 526 and 3 527. All three front end processes belong to front end process same purpose group 1 525. Front end process 3 527 also provides 521 front end service 4 513.

Transactions executed by front end services 1 510, 2 511 and 3 513, call 516, 517, 518, back end service 3 528 with back end service same purpose group 1 529. Back end service 3 is provided by back end process 1 540, which belongs to backend process 1 same purpose group 541.

Front end process 1 524 is executed 531 in front end container 1 535 of front-end container same purpose group 1 536, which also executes 530 auxiliary process 2 522. Auxiliary process 1 belongs to auxiliary process same purpose group 2 523.

Front end process 2 526 is executed 532 by front end container 2 537 and front-end process 3 527 is executed 533 by front end container 3 539. Both front end container 2 and front-end container 3 belong to the front-end container 2 same purpose group 538.

Front end container 1 535 and front-end container 2 are both executed 542, 543 on host 1 546 belonging to host same purpose group 1 547 and the virtualized host 1 546 is provided 550 by hypervisor VM 1 552 of hypervisor same purpose group 1 553.

Front end container 3 539 and back end process 1 540 are both executed 544, 545 on host 2 548, which is part of host same purpose group 2 549. Virtualized host 2 548 is provided 551 by hypervisor VM 2 554 of hypervisor VM 2 same purpose group 555.

Coming now to FIGS. 6*a*-6*b*, which provides flow charts of two alternative approaches to identify sets of causally related abnormal operating conditions that are observed in a monitored environment 101. Design and architecture of modern applications typically follow service-oriented application principles to improve flexibility and to use various virtualization techniques like containers or hypervisors. Although this creates highly scalable and adaptable applications, this also introduces various functional and resource bound dependencies between different parts of application components and application execution environment. Consequently, erroneous behavior in one component typically affects various other components and may cause abnormal operating conditions on those components. Such adverse effects may iteratively propagate to various other components, which then also show abnormal operating conditions. Therefore, the typical error pattern that is seen in such environments are multiple abnormal operating conditions on various components that occur nearly simultaneously.

A first goal of monitoring systems directed to such environments is to identify and group those abnormal operating conditions that are causally related. After sets of causally related abnormal operating conditions are identified, the next step is to identify a subset of abnormal operating conditions that cause the remaining causally dependent abnormal operating conditions as set of root cause conditions. Existing causality estimation systems try to identify sets of causally dependent abnormal operating conditions or evidences and candidates for root causes in one step. However, practical experience has shown that especially the identification of root cause candidates is often not satisfying, therefore this new approach first separates the detection of causally dependent evidences and the identification of root cause candidates and second includes more data describing the evidences to further identify and group those evidences that represent different symptoms of the same cause.

FIGS. 6*a* and 6*b* describe two exemplary processing variants to identify causally dependent evidences. The subsequent methodologies described herein may be applied to sets of causally dependent evidences that were identified using technologies as conceptually described in FIG. 6. However, also other types of processing may be applied to identify the sets of causally dependent evidences that form the input of below described grouping and ranking techniques.

FIG. 6*a* describes a variant to identify causally dependent evidences that is based on trigger events. The monitoring system performs more intensive monitoring in form of e.g. calculating adaptive reference values and continuous checking for abnormal operating conditions on a subset of the monitored environment and only stores monitoring data in form of time series, topology and transaction data for the rest of the monitored environment. On detection of an abnormal operating condition, a trigger event is generated. This trigger event is received by a causality estimation module in step 600. The trigger event contains data describing type, extent and timing of the abnormal operating condition together with data describing its location in the instance level 126 of the topology model.

Following step 601 may first initialize an empty set of causally dependent evidences and add the trigger event to this set. Afterwards, step 601 may analyze topology entities that are directly connected with the topology entity on which the trigger event occurred for abnormal operating conditions that may have caused the trigger event. Those identified abnormal operating conditions are added to the set of causally dependent evidences.

Following step 602 starts a recursive search for other evidences on topology entities directly connected to the topology entities on which causally related abnormal operating conditions were found in step 601 or in a previous execution of step 602. Abnormal operating conditions found on those topology entities are also added to the list of causally dependent evidences. An abnormal operating condition which was identified as the cause of another abnormal operating condition may also be referred as explaining evidence of the other abnormal operating condition.

Following decision step 603 checks whether the recursive search is exhausted. The recursive search may e.g. be exhausted if no more directly connected topology entities are available that have not been analyzed, or if none of the directly connected topology entities shows explaining evidences. The process continues with step 602 when decision step 603 determines that the recursive search is not exhausted. Otherwise, the process ends with step 604. The generated list of causally related evidences may be provided for further analysis.

FIG. 6*b* shows a process variant to identify causally related evidences based on pairwise causality analyses for identified abnormal operating conditions. In this approach, the whole monitored environment is continuously observed to identify new abnormal operating conditions or evidences. The process is executed cyclically, e.g. every 10 seconds, every minute etc. and starts with step 610 when the cycle time since the last execution is elapsed, and queries for new evidences. Following step 611 calculates pairwise causality probabilities between new evidences and already known evidences and subsequent step 612 connects evidences for which the probability of a causal relationship is above a certain threshold. Steps 610 to 612 incrementally create sets of causally related evidences. Following step 613 identifies sets of causally related evidences for which no further causally related event can be expected and provides those sets for further analysis. Evidences in those stable sets are also no longer considered in the event pairing processing performed in steps 611 and 612. Step 613 may e.g. identify stable sets of causally related evidences by analyzing the timing of those evidences. Evidence sets that only contain evidences with an end time that earlier than a specific time may be considered stable. Those sets may be considered stable because new evidences cannot be causally related due to the timing differences between the new evidences and the evidences in the set.

After stable sets of causally depending evidences were identified in step 613, the process ends with step 614.

FIGS. 6*a* and 6*b* only provide a high-level overview of two approaches to identify causal dependencies between observed abnormal operating conditions using data describing the abnormal operating conditions and a topology model describing paths on which causal relationships may travel. The description provided herein is restricted to concepts that support the understanding of processing performed on the results of those approaches.

A detailed description of the causality estimation mechanism described in FIG. 6*a* can be found in U.S. Pat. No. 10,083,073 "Method and System for Real-Time Causality and Root Cause Determination of Transaction and Infrastructure related Events provided by Multiple, Heterogeneous Agents" by H. Moser et. al.

U.S. patent application Ser. No. 16/519,428 "Method And System For Automatic Real-Time Causality Analysis Of End User Impacting System Anomalies Using Causality Rules And Topological Understanding Of The System To Effectively Filter Relevant Monitoring Data" by E. Ambichl et al. discloses a system that performs causality estimation as briefly described in FIG. 6b.

It is noteworthy that the processing described herein to identify groups of evidences in sets of previously defined evidences that are causally related, may be based on sets of identified causally dependent evidences that were identified by mechanisms that are different than those described in FIGS. 6a and 6b, as long as they provide sets of causally dependent evidences, for which each evidence can be located in a topology model of the monitored environment.

Coming now to FIGS. 7a-7d, which visually describes different types of evidence groups that are based on knowledge about the topology entities on which they were observed.

Root cause groups or evidence groups group evidences that occurred on different topology entities based on properties that those topology entities have in common. Horizontal groups, as exemplary depicted in FIG. 7a group evidences that occurred on entities that most probable execute the same code. Such entities that share the same code may be identified using data of the topology same purpose layer 125 of the topology, as topology same purpose group nodes group entities that are identical according to received structural monitoring data, like e.g. the same or similar start command lines for processes or identical access data for services, like service name and parameters. FIG. 7a shows horizontal group 1 701, consisting of service 1 702, service 2 703 and service 3 704. Unexpected operating conditions were reported for those services, and as those services belong to topology same purpose group service same purpose group 1 705 they are therefore added to vertical group 1 701.

Horizontal group 2 710 groups evidences that occurred on service 4 711 and service 5 712 because they belong to the same topology same purpose group 713.

Vertical groups as exemplary shown in FIG. 7b, group evidences that occurred on topology entities that are in a resource related relationship. Services executed by processes typically use resources available for the process and processes in turn use resources provided and managed by the host computing system on which they are running. Evidences that occurred on different topology entities that are in a resource related relationship are grouped by vertical groups, as those evidences may most probably show different symptoms of the same cause. As an example, increased CPU usage seen on a process and on the host computing system executing this process, most probably represent symptoms of the same cause, which may e.g. a change code executed by a service provided by the process that now required more CPU resources.

Vertical group 1 720 groups evidences that occurred on service 1 702, with evidences on process 1 722, which provides 721 service 1. Process 1 is executed 724 on container 1 725, which runs 727 on virtualized host 1 728. Virtualized host 1 is provided 730 by hypervisor 1 731. All those topology entities are in a resource relationship and evidences that occurred on them are therefore added to vertical group 720. As each of those entities depends on the entity next below, it can also be said that those entities form a vertical stack.

Vertical group 2 730 groups evidences that occurred on service 5 712, process 1 722, container 1 725, host 1 728 and hypervisor 1 732. The topology same purpose groups of the entities 705, 713, 723, 726, 729 and 732 are not relevant for the vertical grouping.

FIG. 7c shows the two exemplary combined groups combined group 1 and combined group 2. Combined groups are formed by combining vertical and horizontal groups that share at least one topology entity. Combined group 1 is e.g. formed by combining horizontal group 2 710 with vertical group 2, as both groups contain evidences that occurred on service 5 712. Combined group 2 is formed by combining vertical group 1 and horizontal group 1, as both groups contain evidences that occurred on service 1 702. The creation of combined groups represents a first step to group evidences that are related due to code sharing relationships with evidences that are related due to resource relationships, that are connected by shared topological locations.

FIG. 7d shows the creation of a merged evidence group by merging combined group 1 and combined group 2. Merging is performed on basis of shared anchor nodes of combined groups. Anchor nodes are topological entities which represent a portion of application specific functionality. As examples, service entities represent functionality only related to a specific service, processes entities represent functionality specific to all services provided by the process, container entities represent functionality of all services provided by all processes executed in the containers and host entities represent the functionality of services of all processes executed on the host directly or via container. All those types of topology entities could be selected as anchor nodes, but as processes represent a natural collection of related application specific functionality, entities of type process are preferably selected as anchor nodes to perform the merging of combined groups.

Combined group 1 and combined group 2 both contain process 1 722, which is the shared anchor node 740 of both combined groups. Evidences that are observed on process 1 722 provide the rationale to create one merged group out of combined groups 1 and 2. The vertical stacks 741 of service 4, service 2 and service 3 are shown here for completeness reasons. If for example an evidence would exist on process 2, which is part of the vertical stack of service 4 711 and service 2 703, then process 2 would also be a shared vertical anchor that could be used to merge combined group 1 and 2.

Coming now to FIG. 8, which shows a set of causally related evidences in the topology example introduced in FIG. 5. An evidence 800 was identified on entry service 1 500, and causality identification detected that evidence 801 on front end service 1 510, evidence 802 on front end service 3 511 and evidence 803 are causally related 820, 821 and 822. It further discovered that evidence 804 on front end service 4 513 is causally related 823 to evidence 803 on service 3. Also a causal relationship 824 between evidences 801 on front end service 1 and evidence 806 on process 1 524 was detected.

Further causal relationships were detected between 828 evidence 806 and 811 on host 1 546, between 827 evidence 811 on host 1 and evidence 805 on auxiliary process 2 522, between 825 evidence 802 on front end service 2 511 and evidence 807 on front end process 2 526, between 830 evidence 807 on front end process 2 and evidence 809 on container 2 537, between 829 evidence 809 on container 2 and evidence 811 on host 1, between 826 evidence 803 on front end service 3 and evidence 808 on front end process 3 527 and between 831 evidence 808 on front end process 3 527 and evidence 810 on front end container 1 539. This example is later used to explain the identification and merging of horizontal and vertical evidence groups by concrete examples.

Coming now to FIG. 9, which provides a flow chart that conceptually describes the processing and integration of various types of monitoring data provided by agents 102 deployed to a monitored environment 101 to identify causally related abnormal operating conditions, to identify groups of those abnormal operating conditions that are connected via additional properties, like resource dependencies or the execution of the same code and to finally determine root cause scores for identified groups of abnormal operating conditions.

The monitoring server performs an ongoing analysis of incoming monitoring data to identify causally related abnormal operating conditions, as e.g. exemplary shown in FIG. 6. The process starts with step 900 when a new set of causally related evidences was identified. Subsequent step 901 identifies horizontal evidence groups by grouping evidences that were observed on topology instance nodes of the same topology same purpose group node. Step 902 groups evidence vertically according to vertical topology instance relations or stack lines by grouping evidences that occurred on the same vertical stack line together. Anchor nodes (processes) define and identify individual vertical groups and all evidences that occur on entities that depend on an anchor node (e.g. services provided by a process) are added to the same vertical group. A detailed description of the vertical grouping process can be found in FIGS. 11a and 11b.

Step 901 and 902 are independent from each other and may be executed in arbitrary order or in parallel.

Following step 903 merges identified horizontal groups that share at least one anchor node by first identifying vertical and horizontal groups that share at least one topology entity (see e.g. FIG. 7c) and then combines the identified vertical and horizontal groups. Afterwards, step 903 identifies combined groups which share at least one anchor node and then merges those groups. A detailed description of the merging process performed in step 903 can be found in FIG. 14a.

Following step 904 identifies a main topology entity for each merged evidence group identified in step 904. The main topology entity of a merged group is defined as the entity of a merged evidence group for which no other topology entities of the same topology same purpose group are present in the merged evidence group. As an example, a merged evidence group may contain evidences that occurred on multiple services of the same topology same purpose group that are all provided by different processes of the same topology same purpose group, but only one of those processes also shows an evidence and is therefore part of the merged evidence group, this process may be identified as the main topology entity of the merged evidence group. A detailed description of the identification of a main topology entity can be found in FIG. 15b. Possible results of step 904 also include an indication that no main topology entity can be identified.

Following step 905 analyzes the merged evidence groups identified by step 903 to identify groups of evidences that are of the same kind, like response time degradations on services in the merged group that belong to the same topology same purpose group. A detailed description of the processing performed by step 905 can be found in FIG. 15c.

Afterwards, step 906 ranks the groups of evidences of the same kind that were found in each merged group according to their root cause relevance. Root cause ranking of same kind evidence groups may be based on heuristics and on measurement data describing the evidences. Used heuristics may include the observation that evidences that occurred in higher levels of the technology stack, like services or processes are more likely to be root causes than evidences observed on lower levels like host operating systems or hypervisors. Consequently, evidences observed on higher technology stack levels get a higher root cause score than evidences observed on lower technology stack levels. Root cause score calculations that are based on measurement data of evidences may consider the extent of the change of measurement values between an expected normal value range and observed, abnormal value described by the measurement data. Evidences that are based on a higher change extent may also be assigned a higher root cause score.

Following step 907 performs a root cause ranking between the identified merged evidence groups. The root cause rank calculation for merged evidence groups may consider the number of evidences in a merged group, or the position of the topology entities of the merged evidence group in the instance layer of the topology model. The instance layer of the topology model also contains entities that represent entries into the monitored environment to e.g. receive requests from customers from outside the monitored environment. A topology position based root cause ranking may e.g. calculate the minimal distance of each topology entity of a merged evidence group from an entry point and then calculate the average of those minimal distances as a root cause rank. As an example, a merged evidence group may contain evidences on two services, one of those services is reachable from the nearest entry point via 2 intermediate service calls and the other service may be reachable via 3 intermediate service calls. The average of those two distances is 2.5, which may be used as one component for the calculation of the root cause rank of the merged evidence group.

Following step 908 provides the merged and ranked evidence groups for further analysis, visualization and storage. The process then ends with step 909.

Referring now to FIGS. 10a-10i, which provides various data records that may be used to store evidence data and different types of evidence groups. The present disclosure includes the grouping of causally dependent evidences according to additional knowledge of the observed environment, which was not considered during the identification of causal relationships between observed abnormal operating conditions. This knowledge includes monitoring data identifying topology entities that server the same purpose, knowledge about resource provision/consumption relationships between topological entities and the general observation that functionality or code that is tighter related to the functionality of individual applications, like functionality or code related to the processing of service requests, or functionality provided by processes, is more likely to be related to the root cause of observed, causally related evidences than functionality or code providing common, fundamental functionality, like operating system or hypervisor services.

The identification of root cause groups and the ranking of those groups according to a root cause relevance score is performed in a sequence of steps, where each step creates intermediate groupings and data structures that may be used as input by a subsequent step.

Generally, evidence records 1000 describe individual observations of abnormal operating conditions contained in a set of currently processed causally related abnormal operating conditions. Vertical stack lines 1010 represent the topology entities that are in a direct or resource provision/ consumption relationship with the topology entity on which a given evidence was observed. Vertical stack lines may be considered as the subset of the instance level of the topology model that is required, for a given evidence, to identify the topology entities that are in a resource provision/consumption relationship with the topology entity on which the evidence was observed.

Vertical evidence entity groups 1020 and horizontal evidence entity groups 1030 represent the outcome of a first grouping step, which groups evidences that occurred on entities that serve the same purpose (horizontal entity groups) and evidences that occurred on entities that occurred on entities that are in a resource provision/consumption relationship (vertical evidence entity groups).

Merged horizontal evidence groups 1040 represent the outcome of a second grouping step, which merges previously identified vertical and horizontal groups into larger groups. In this step, first horizontal and vertical groups are combined which contain at least one evidence that occurred on the same topology entity. Afterwards, those groups are further combined by evidences they share on lower topological levels. The anchor instance 1012 of vertical stack lines is used to control the search for shared evidences, as it specifies the topology level until which a search for evidences on shared topological entities is performed. As an example, if the anchor instance for two candidate vertical evidence entity groups would be two different processes running on the same host computing system and this host computing system would show an evidence, the two groups would not be merged because the shared evidence is below the topology search level. If the anchor instances of both vertical evidence entity groups would have been the host computing system, they would have been merged.

A default anchor entity level (service, process, container, host computing system etc.) may be defined which is the highest possible topology level for an anchor instance. In case the default anchor entity level is the process level, for vertical evidence entity groups containing evidence at and above the process level, the process level entity would be selected as anchor entity. For vertical evidence entity groups only containing evidence below the process level, the entity at the highest topology level (host computing system, hypervisor) contained in the vertical evidence entity group may be selected as anchor instance.

The default anchor entity level may also be used to tune the second combination step, where a higher default anchor entity level (e.g. service, process) produces a higher number of smaller merged groups and a lower default anchor entity level (e.g. container, host computing system) produces a smaller number of larger groups.

Experiments with real-world data revealed that the process level is the optimal choice to produce sets of combined groups that are well balanced in terms of size and number of groups.

Horizontal stack slices 1050 and merged evidence stack slice groups 1060 are afterwards used to organize and group the evidences grouped by merged horizontal entity groups, e.g. by the type of the topology entity on which they were observed.

Evidence group layers 1070 and ranked evidence groups 1080 are finally used to assign root cause scores to identified groups of evidences and to the evidences forming those groups.

FIG. 10*a* shows an evidence record 1000, which may be used to store data describing an evidence as e.g. discovered by the anomaly detection/causality estimation module 130. An evidence record 1000 may contain but is not limited to an evidence identifier 1001, uniquely identifying an observed evidence, an evidence type identifier specifying the type of the observed evidence, like e.g. increased response time, error rate or CPU usage, a topology instance location 1003 containing data identifying the topological location on which the evidence was observed, duration data 1004, specifying the temporal extent of the abnormal situation, e.g. in form of a start time and an end time, and evidence data 1005 consisting of monitoring data that led to the identification of the abnormal operating condition.

Vertical stack line records 1010, which may be used to store the topological vertical stack of an observed abnormal operating condition are shown in FIG. 10*b*. A vertical stack line record 1010 may contain but is not limited to an anchor instance entry 1011 containing data to identify the anchor entity of the vertical stack line (i.e. process entity that sits on the described vertical stack line), and a topology stack list 1013, containing references of the topology instance nodes 1014 building the vertical stack line. The topology stack list 1014 is sorted according to the technology stack layers (e.g. service→process→container→host computing system→hypervisor).

Vertical evidence entity group records 1020 as shown in FIG. 10*c*, may be used to store evidences that were observed on the same vertical stack line. A vertical entity group record 1020 may contain but is not limited to an anchor instance field 1021, storing a reference to the topology instance entity that is the anchor entity of the vertical stack line that groups the evidences, and a stack evidences set 1023, containing references 1024 to evidence records 1000 that were observed on topology instance entities of the corresponding vertical stack line.

FIG. 10*d* shows a horizontal evidence entity group record 1030, which may be used to represent horizontal groups of evidences that are based on topology same purpose groups. A horizontal evidence entity group record 1030 may contain but is not limited to a reference to a topology same purpose group node 1031, which identifies the topology same purpose group node 350 which groups the topology instance entities on which evidences stored in the horizontal evidence entity group were observed, an a same purpose group evidences set 1032, containing references 1033 to evidence records 1000, that occurred on topology instance entities of the referred topology same purpose group node.

Merged horizontal evidence entity groups 1040, as shown in FIG. 10*e*, may be used to store sets of horizontal evidence entity groups 1020 that share at least one anchor node.

A merged horizontal entity group 1040 may contain but not limited to a list of horizontal evidence entity groups 1041, containing references 1042 to horizontal evidence entity groups 1030, which are connected by at least one shared anchor entity, and a set of anchor nodes 1043, containing references 1044 to all topology instance nodes 340 that are anchor nodes of all evidences of all evidences referred in horizontal evidence entity group records stored in the list of horizontal evidence entity groups 1041 of the merged horizontal evidence entity group 1040.

Horizontal stack slices 1050, as shown in FIG. 10*f*, may be used to group evidences that occurred on entity instances belonging to one topology same purpose group and that also have the same topology type. A horizontal stack slice 1050 may contain but is not limited to a topology type field 1051, storing a topology type 343 of topology instance nodes 340, where all evidences grouped by the horizontal stack slice were observed on topology instance nodes of the stored type, a reference 1052 to a topology same purpose group node, where evidences grouped by the horizontal stack slice were observed on topology instance nodes belonging to the referred topology same purpose group, and a horizontal slice evidences set 1053, containing references 1054 to evidences 1000 grouped by the horizontal stack slice.

FIG. 10g shows a merged evidence stack slice group 1060, which may be used to group horizontal stack slices 1050 that are connected by a shared anchor node, i.e. a merged evidence stack slice group 1060 may group all horizontal stack slices 1050 that correspond to horizontal evidence entity groups 1030 of the same merged horizontal evidence entity group 1040. A merged evidence stack slice group 1060 may contain but is not limited to a reference 1061 to the topology same purpose group node 350 representing the main topology same purpose group node 350 of the merged evidence stack slice group 1060 and a set of horizontal stack slices 1062, containing references to the horizontal stack slices 1050 grouped by the merged evidence stack slice group 1060. The main same purpose group 1061 represents the topology same purpose group 350 corresponding to the merged evidence stack slice group 1060 for which only evidences were observed on one topology instance node of the topology same purpose group. FIG. 15b describes the identification of main same purpose groups in detail.

Evidence group layers 1070, as displayed in FIG. 10h may be used to rank evidences corresponding to a horizontal stack slice 1050 according to their root cause relevance. An evidence group layer 1070 may contain but is not limited to a reference 1071 to a defining topology type, where the defining topology type refers to the topology type of all topology entities on which evidences grouped by the evidence group layer were observed, a reference 1070 to a defining same purpose group 1072, which refers to the topology same purpose group to which all topology entities on which evidences that correspond to the evidence group layer were observed, and a list of equivalent evidences 1073, containing groups of equivalent evidences 1057. The groups of equivalent evidences in the list of equivalent evidences are sorted according to an evidence type based root cause relevance rank. Evidence type based root cause relevance ranking may e.g. based on heuristics which is used to assign different evidence types (CPU/response time/load increase etc.) different root cause relevance scores. Those scores may then be used to sort and rank groups of identified equivalent evidences 1075. Equivalent evidence groups 1075 may contain references 1074 to evidences 1000 of the same type, where those evidences may in turn be sorted and ranked according to an evidence instance based root cause relevance. Instance based root cause relevance may e.g. be based on monitoring data describing the evidences. An evidence instance based root cause score may e.g. be derived from the extend of a monitored change. Evidences corresponding to a higher relative change may be assigned a higher root cause relevance than evidences corresponding to a lower relative change.

Ranked evidence group records 1080, as shown in FIG. 10i, may be used to store groups of vertically and horizontally grouped and merged evidences together with a root cause relevance rank or score for the whole evidence group.

A ranked evidence group record 1080 may contain but is not limited to a group root cause relevance rank 1081, which may be derived from the evidences contained in the group and the topology instance entities on which the evidences were observed, a main evidence group layer 1082, a list 1083 of reverences 1084 to evidence group layers 1070 sorted according to the technology stack level (service-→process→container . . . ) of the defining topology types 1071 of the referred evidence group layer records 1070, an evidence instance entity to host instance entity mapping 1085, which contains for each referred evidence a mapping to the topology instance entity representing the host on which the evidence occurred and temporal focus data 1086, which specifies the temporal period covered by the ranked evidence group, e.g. as time period from the earliest start time of any referred evidence to the latest end time of any referred reference.

Coming now to FIGS. 11a-11c which provides various processes that are performed to group observed evidences according to the topology location on which the evidence where observed. The processes described in FIG. 11 represent the first stage of the grouping process whereas the processes described on FIG. 14 represent the second stage.

FIG. 11a provides a flow chart of a process to identify the vertical stack lines for observed evidences. The process is performed for all evidences in a received set of causally related evidences and starts with step 1100 when a new set of causally related evidences is received. Following decision step 1101 checks if the instance entity on which the currently processed evidence was already considered during the previous processing of other evidences contained in the currently processed set of causally related evidences. In case the topology entity was already processed, the process ends with step 1110.

Otherwise, step 1102 is executed, which creates a new, empty vertical stack line record 1010, followed by step 1103 which fetches the topology instance location 1003 of the evidence record 1000 to identify its direct and indirect parent topology instance entities, i.e. by following the parent references specified by the parent topology identifier data 342 stored in topology instance nodes 340. Step 1103 may e.g. fetch the topology instance node corresponding to the location of the processed evidence and then use its parent topology identifier to fetch the topology instance node representing the parent component and then fetch the parent topology identifier data of this topology instance node to fetch the parents parent. This may be repeated until the parent topology identifier data of a fetched topology instance node is not set. The topology instance entity on which the evidence was observed, and its fetched parent topology instance entities may then be added to the topology stack list 1013 of the previously created vertical stack line.

Afterwards, step 1104 determines whether the evidence occurred on a service entity (or, more generic, if the evidence occurred on a topology entity that is above the anchor node level in the topology stack. In case the anchor node level would be set to host operating systems instead of processes, step 1104 would e.g. determine whether the evidence occurred on a service or on a process.) and in case the evidence did not occur on a service, step 1106 is executed which sets the topology instance entity on which the evidence occurred as anchor instance 1012. In case the evidence occurred on a service, step 1105 is executed which sets the process providing the service as anchor instance 1012.

Decision step 1107 is executed afterwards which determines whether the currently processed evidence occurred on a process. When it is determined that the evidence occurred on a process, then all services provided by the process are added to the topology stack list 1013 by step 1108.

Afterwards, step 1109 is executed, either after step 1108, or when decision step 1107 determined that the evidence did not occur on a process. Step 1109 sorts the topology instance entity nodes in the topology stack list according to their stack level (i.e. service→process→container→host computing system . . . ). The process then ends with step 1110.

FIG. 11*b* shows a flow chart of a process that analyzes received sets of causally related evidences to create vertical evidence entity groups. The process is executed for each vertical stack line 1010 created by the process described in FIG. 11*a* and starts with step 1120. Following step 1121 creates a new vertical evidence entity group 1020 and subsequent step 1122 sets the anchor instance 1012 of the currently processed vertical stack line 1010 to the anchor instance 1022 of the created vertical evidence entity group 1020.

Afterwards, step 1123 fetches all those of the received causally dependent evidences that were observed on topology instance entities contained in the topology stack list 1013 of the currently processed vertical stack line 1010. Following step 1124 adds the fetched evidences to the stack evidences set 1023 of the previously created vertical evidence entity group 1020. The process then ends with step 1125.

FIG. 11*c* provides a flow chart of a process that creates horizontal evidence entity groups for received causally dependent evidences. The process is executed for each evidence in the received set and starts with step 1130. Following step 1131 may first fetch the topology instance node reported as the location of the currently processed evidence and then use the same purpose group identifier data 344 of the topology instance node 340, to fetch the topology same purpose group node 350 of the topology entity on which the evidence was observed.

Following decision step 1132 determines whether a horizontal evidence entity group 1030 already exists for the previously fetched topology same purpose group in combination with the currently processed evidence set. Step 1132 may e.g. maintain a set of already created horizontal evidence entity groups for each received set of causally dependent evidences and check whether a horizontal evidence entity group for the fetched same purpose group exists in this set. In case a matching horizontal evidence entity group already exists, the process continues with step 1135. Otherwise, step 1134 is executed, which creates a new horizontal evidence entity group 1030 and sets its same purpose group reference 1031 to the previously fetched topology same purpose group.

Following step 1135 adds the currently processed evidence to the same purpose group evidences set 1032 of the horizontal evidence entity group that was either created in step 1134 or fetched in step 1132. The process then ends with step 1136.

Coming now to FIG. 12, which shows identified vertical groups in the example topology situation introduced in FIG. 5 and the example set of causally related evidences added in FIG. 8.

The execution of the processes described in FIGS. 11*a* and 11*b* identified a first vertical evidence entity group 1200 containing evidences 805 and 811, which occurred on auxiliary process 2 522 and on host 1 546, a second vertical evidence group 1201, grouping evidences 801, 806 and 811, which occurred on front end service 1 510, front end process 1 524 and host 1 546, a third vertical evidence entity group 1202, containing evidences 802, 807 and 811, which occurred on front end service 2 511, front end process 2 526, front end container 2 537 and host 1 546, and a fourth vertical evidence entity group 1203, grouping evidences 803, 804, 808 and 810, which occurred on entities front end service 3 512, front end service 4 513, front end process 3 547 and front end container 1 539.

The identified vertical groups show an overlap on host 1 546, which supports the hypothesis that host 1 has high relevance for the observed abnormal conditions, but it does not consider that subsets of those evidences were observed on entities that served the same purpose, like evidences 801, 802 and 803, which occurred on service entities which all belong to the same topology same purpose group 514.

FIG. 13 illustrates the identification of horizontal evidence entity groups 1030, as e.g. performed by the process described in FIG. 11*c* on the previously described example evidence and topology data.

The process identifies a first horizontal evidence entity group 1300, containing evidences 801, 802 and 803, which were observed on front end services 1 510, 2 511 and 3 512, a second horizontal evidence entity group 1301, only containing evidence 804 on entity front end service 4, a third horizontal evidence entity group 1302, only containing evidence 805 on auxiliary process 2 522, a fourth horizontal evidence entity group 1303, grouping evidences 806, 807 and 808, observed on front end processes 1 524, 2 526 and 3 527, all belonging to topology same purpose group 525, a fifth horizontal evidence entity group 1304, consisting of evidences 809 and 810, observed on front end container 2 537 and front end container 1 539, all belonging to topology same purpose group 538, and horizontal evidence entity group 1305, only containing evidence 811 which was observed on host 1 536.

FIG. 13 also illustrates horizontal evidence entity groups on different horizontal stack levels, like e.g. horizontal evidence entity groups 1300 and 1301 on service level, horizontal evidence entity groups 1302 and 1303 on process level, horizontal evidence entity group 1304 on container level and horizontal evidence entity group 1305 on host level.

Coming now to FIGS. 14*a*-14*d*, which provides flow charts of processes related to the further processing of previously identified horizontal and vertical evidence groups to identify and merge those groups that are connected via shared anchor nodes.

FIG. 14*a* describes the process performed to create merged horizontal evidence entity groups 1040 out of horizontal evidence entity groups 1030. The process is executed for each horizontal evidence entity group 1030 identified in a received set of causally related evidences and starts with step 1400. Following step 1401 fetches for each evidence of the currently processed horizontal evidence entity group 1030, the topology instance node 340 on which the evidence was observed. Afterwards, step 1402 identifies the anchor instances for each topology instance node fetched in step 1401. Step 1402 may e.g. identify for each fetched topology instance node 340, the vertical stack line record 1010 containing the topology instance node in its topology stack line and then fetch the topology entity node 340 identified as anchor instance 1011 of the vertical stack line record.

Subsequent step 1403 fetches those merged horizontal evidence entity groups 1040 that were previously created for the received set of causally related evidences for which the set intersection of the set of anchor nodes 1043 with the set of anchor nodes determined by step 1402 for the currently processed horizontal evidence entity group is not empty. In other words, those merged horizontal evidence entity groups are fetched for which the set of anchor nodes 1043 contains at least one topology instance that is also contained in the set of anchor nodes for the currently processed horizontal evidence entity group in determined in step 1402.

In case no merged horizontal evidence entity groups 1040 with intersecting anchor nodes is found by step 1403, step

1405 is executed, which creates a new empty merged horizontal entity evidence group.

If otherwise one or more merged horizontal evidence entity groups 1040 are identified that have an intersection with the anchor nodes of the currently processed horizontal evidence entity group 1030, then those previously independent merged horizontal evidence entity groups 1040 are connected by the currently processed horizontal evidence entity group 1030. Those merged horizontal evidence entity groups 1040 are then merged by step 1406, which first creates a new empty merged horizontal entity evidence group 1040. Afterwards, step 1406 adds the horizontal evidence entity groups 1030 contained in the list of horizontal evidence entity groups 1041 of all merged horizontal entity evidence groups identified by step 1403 to the list of horizontal evidence entity groups 1041 of the new created merged horizontal evidence entity group 1040. Also, the topology instance nodes contained in the anchor sets 1043 of all merged horizontal entity evidence groups identified by step 1403 are added to the anchor set 1043 of the new created merged horizontal evidence entity group 1040. Duplicates in the list of horizontal evidence entity groups 1041 and anchor entity set 1043 of the new created merged horizontal evidence entity group 1040 may be removed.

Afterwards, the merged horizontal evidence entity group 1040 identified by step 1403 may be removed, as they are now represented by the new created merged horizontal evidence entity group 1040.

Step 1407 is afterwards executed which merges the currently processed evidence entity group 1030 to the new merged horizontal evidence entity group 1040 created by step 1405 or 1407. Merging of the evidence entity group 1030 may be performed by adding it to the list of horizontal evidence entity groups 1040 and adding all anchor nodes identified by step 1402 to the set of anchor nodes 1403 (by maintaining a duplicate free set).

The process afterwards ends with step 1408.

FIG. 14 *b* describes the creation of merged evidence stack slice groups out of merged horizontal evidence entity groups. The process is performed for every merged horizontal evidence entity group 1040 created by the process described in FIG. 14*a* and starts with step 1410. Following step 1411 creates a new merged evidence stack slice group record 1060 and subsequent step 1412 creates a horizontal stack slice record 1050 for each horizontal evidence entity group 1042 contained in the list of horizontal evidence entity groups 1041 of the currently processed merged horizontal evidence entity group. The creation of horizontal stack slice record is described in FIG. 14*c*.

Afterwards, step 1413 adds the horizontal stack slice records created by step 1412 to the set of horizontal stack slices 1062 of the merged evidence stack slice group 1060 that was created in step 1411. The process then ends with step 1413.

The process of creating horizontal stack slices 1050 is described in 14*c* and starts with step 1420, when a horizontal evidence entity group is received, for which corresponding horizontal stack slices 1050 should be created. Following step 1421 groups the evidences 1000 contained in the evidences set 1033 of the receive horizontal evidence entity group 1030 according to the topology type 343 of the topology instance entity 340 on which the evidences were observed.

Afterwards, step 1422 is executed for each group of evidences that was identified by step 1421. Each execution of step 1422 may first create a horizontal stack slice record for the currently processed evidence group and set the topology type 1051 of the created horizontal stack slice record to the topology type that defines the currently processed evidence group. Further, step 1422 may set the same purpose group 1052 of the created horizontal stack slice record to the same purpose group 1032 of the received horizontal evidence entity group. Finally, step 1422 may set currently processed group of evidences to the horizontal slice evidences set 1053 of the created horizontal stack slice record. The process then ends with step 1423. One purpose of the conversion of horizontal evidence entity groups into horizontal stack slices is to compensate for errors in the identification of same purpose groups. In theory, a same purpose group should, as it only contains entities that serve the same purpose, also only contain entities that have the same topology instance type. But as the identification of same purpose groups is based on the existence of monitoring data that cannot be influenced by the monitoring system and further used also heuristics to identify entities of that serve the same purpose, this process may also produce incorrect assignments of topology entities to same purpose groups. The additional consideration of the topology instance type for the creation of horizontal stack slices helps to compensate those types of errors.

A process that for the creation of ranked evidence groups 1080, out of merged evidence stack slice groups 1060 is shown in FIG. 14*d*. The process is executed for each merged evidence stack slice group created by the process described in FIG. 14*b* and starts with step 1430, when a new merged evidence stack slice group 1060 is received. Following step 1431 creates a new ranked evidence group 1080, and calculates the root cause rank for the group, considering the evidences contained in the received merged horizontal evidence entity group and the topological location of those evidences. The calculated root cause rank is set to the group root cause relevance rank 1081 of the created ranked evidence group. FIG. 15*a* provides a detailed description of the root cause relevance rank calculation for a merged horizontal evidence entity group 1040.

Afterwards, step 1432 creates an evidence group layer record 1070 for each horizontal stack slice 1050 contained in the horizontal stack slice set 1062 of the received merge evidence stack slice group 1060. The creation of evidence group layer record is described in detail in FIG. 15*c*. Subsequent step 1433 may first sort the evidence group layer records 1070 created by step 1432 according to their stack level (service→process→container etc.), as defined by the topology type 1071 stored in the evidence group layer records 1070 and then set the sorted list of evidence group layer records to the list of evidence group layers 1083 of the ranked evidence group created in step 1431.

Following step 1434 then determines and sets the main evidence group layer 1082 for the new ranked evidence group. The main evidence group layer may be selected by identifying the evidence group layer 1070 which has a defining same purpose group 1072 that is equal to the main same purpose group 1061 of the received merge evidence stack slice group 1060. Afterwards, step 1435 is executed, which initializes the evidence instance entity to host instance entity mapping 1085 of the ranked evidence group 1080. Step 1435 creates for each evidence that was observed on a service, process or container, a mapping to the topology entity representing the host computing system on which the service, process or container were executed. The created mappings are stored in the evidence instance entity to host instance entity mapping 1085 of the created ranked evidence group and may be used to provide a quick overview about the host computing system that are involved in the evidences 1000 represented by the ranked evidence group 1080, or to show evidences of specific host computing systems.

Following step 1436 then calculates the temporal focus of the ranked evidence group 1080, e.g. by determining the earliest start time and the latest end time of any evidence referred in an evidence group layer of the ranked evidence group and use those time stamps as start time and end time of the temporal focus of the ranked evidence group. The calculated temporal focus may be stored in the group temporal focus field 1086 of the created ranked evidence group. The temporal focus may e.g. be used for the visualization of evidence data of the ranked evidence group, like measurement time series, and define the time period for which time series data is presented for the ranked evidence group. The process then ends with step 1437.

Coming now to FIGS. 15a-15c, which provides flow charts of processes related to the calculation of root cause ranks for different groups of evidences and for individual evidences, and for the determination of main same purpose groups for merged stack slice groups.

FIG. 15a shows the flowchart of a process to calculate the root cause relevance score for a ranked evidence group 1080. The process starts with step 1500, when a merged evidence stack slice group 1060 for which a ranked evidence group 1080 should be created is received for the calculation of a root cause relevance score.

Following step 1501 calculates for each evidence of the received ranked evidence group an average entry distance of the topology entity on which the evidence was observed. The entry distance of a topology entity may be defined as the number of hops or transitions from a topology entity that represents an entry to the monitored system (e.g. a service which receives external requests) to the topology entity on which an evidence corresponding to the currently processed ranked evidence group was observed. As there may be different entry points from which a topology entity is reachable, and there may be different paths through the topology model from an entry entity to the entity on which an evidence was observed, different entry distances may exist for one evidence. Therefore, an average entry distance is calculated for each evidence in the currently processed merged evidence stack slice group 1060. The maximum of the calculated average entry distances of the group may be selected and used as raw, distance-based root cause relevance factor. The value range of this raw factor is 0 to theoretically infinite (considering a topology model with an infinite number of entities and an infinite number of connections between those entities). Such values may, in some cases be difficult to compare or to combine with other score factors. Therefore, it is desired to "normalize" this factor, which means projecting the original values of the factor into the interval from 0 to 1. To perform such a normalization, first the maximum average distance of all merged evidence stack slice groups 1060 created from the currently processed set of causally related evidences may be determined as overall maximum average distance. The maximum average distances calculated for all merged evidence stack slice groups 1060 may then be divided by the overall maximum average distance to create normalized distance-based root cause relevance factors with a value range from 0 to 1.

The calculated normalized distance-based root cause relevance factors may also be referred to as first normalized root cause relevance factor. The rationale behind the first root cause relevance factor is that the higher the distance is between an observed evidence and a system entry, the higher is the probability that the evidence caused other evidences on the path to the system entry, which also increases the probability that the evidence is a root cause.

Following step 1502 calculates a second root cause relevance factor based on measurement data of the evidences of the received merged evidence stack slice group 1060. Step 1502 may first fetch the type of an evidence and the type specific evidence measurement data. Afterwards, a normalized value corresponding e.g. to the relative extent of the change that caused the creation of the evidence may be calculated. For time series change point-based evidences, a relative change amplitude may be calculated by first calculating difference and sum of the maximum and minimum values of the considered time series data points and then dividing the difference by the sum. The relative change point amplitudes of all evidences may be aggregated and normalized by e.g. selecting the maximum relative change point amplitude or calculating an average. The aggregated and normalized relative change point amplitude may be used as second root cause relevance factor.

A third root cause relevance factor may be calculated by step 1503, which is based on the number of all hypotheses that were evaluated on all topology entities on which evidences of the currently processed merged evidence stack group were observed, during the temporal focus of the merged evidence stack group, and the number of evidences of the merged evidence stack group. The number of evaluated hypotheses represents the number of evidences that could possibly have happened on the topology entities corresponding to the merged evidence stack group. The number of potential evidences (evaluated hypotheses) may be related to the number of observed evidences. The ratio of observed evidences to potential evidences (observed evidences divided by evaluated hypotheses) may be used as third root cause relevance factor.

Following step 1504 may then combine the previously calculated root cause factors into one root cause score which may then be provided e.g. for storage in a ranked evidence group. Combination may e.g. be performed by multiplying the factors or summing them. Other variants may consider the tree factors as distances from an origin in different dimensions and calculate the length of a space diagonal as root cause score. Some variants may only calculate and combine a subset or one of the above described root cause relevance factors to create an overall root cause score. The process then ends with step 1505.

FIG. 15b describes the process to identify the main same purpose group 1061 for a merged evidence stack slice group 1060. The process starts with step 1510 when a merged stack slice group 1060 with an already populated set of horizontal stack slices 1062 is received. Following step 1511 sorts the horizontal stack slices of the received evidence stack slice group according to the stack level of their topology type 1051, from highest stack level (e.g. service) to lowest (e.g. hypervisor). Following step 1512 first fetches the horizontal stack slices at the highest stack level, potential subsequent executions of step 1512 fetch the stack slices at the next lower stack level (i.e. first execution fetches horizontal stack slices at the service level, the next execution will fetch horizontal stack slices a the process level etc.).

Following decision step 1513 checks whether the currently processed stack level only contains one horizontal stack slice, i.e. step 1512 only returned one horizontal stack slice with a topology type equal to the currently processed stack level. In case only one matching horizontal stack slice was found, step 1517 is executed which indicates the same purpose group of the single horizontal stack slice returned by step 1512 as main same purpose group of the merged stack slice group. The process then ends with step 1521.

In case step 1512 detected multiple horizontal stack slices for the current stack level, step 1514 is executed, which analyzes the evidences assigned to the different fetched horizontal stack slice to identify one horizontal stack slice that contains significantly more evidences than the other horizontal stack slices for the stack level. Step 1514 may e.g. determine whether only one of the analyzed horizontal stack slices contains evidences, whether the horizontal stack slice with the highest number of evidences has an evidence count that is at least twice the evidence count of the horizontal stack slice with the second highest event count etc.

In case a horizontal stack slice with significantly more evidences is identified by step 1514, following decision step 1515 continues the process with step 1518 which notifies the same purpose group of the identified horizontal stack slice as main same purpose group.

Otherwise, step 1516 is executed which tries to identify a horizontal stack slice which has a significantly higher evidence measurement data based root cause rank than the other horizontal stack slices returned by step 1512. Root cause rank values may be determined as already described in step 1503 of FIG. 15*a*, and the existence of a horizontal stack slice with significantly higher root cause rank may be determined as already described for evidence count in step 1514.

In case a horizontal stack slice with significantly higher root cause rank was identified, the process continues with step 1518 which notifies the same purpose group of the identified horizontal stack slice as main same purpose group.

Otherwise, decision step 1519 is executed, which checks if a next lower stack level is available (i.e. whether the stack level scan already reached the lowest stack level containing hypervisor topology entities). In case a next lower stack level is available, step 1512 is executed. Otherwise step 1520 is executed which indicates that no main same purpose group could be identified, and the process ends with step 1521.

If a main same purpose group for a merged stack slice group could be identified, then it represents the same purpose group at the highest possible stack level which differs from other same purpose groups at the same stack level by showing significantly more observed abnormal behavior than the other same purpose groups at the same level. Evidences of an identified main same purpose group are good root cause candidates, and the presentation of an identified main same purpose group to a user of the monitoring system may greatly improve the its understanding of the structure of the currently observed problem.

FIG. 15*c* describes the process of creating evidence group layers 1070 out of horizontal stack slices 1050. The process starts with step 1530, when a new horizontal stack slice 1050 is received. Following step 1531 fetches the evidences contained in the evidences set 1053 of the received horizontal stack slice and groups the fetched evidences by their evidence type 1002.

Afterwards, step 1532 is executed which creates an equivalent evidences record 1075 for each group of evidences having the same evidence type and appends each identified evidence group to one of the created equivalent evidences records. Afterwards, step 1532 calculates a root cause relevance score for each evidence and sorts the evidences in each equivalent evidences record descending by their root cause score. The root cause score for the evidence instances may be calculated based on the underlying measurements of the evidences, as described in step 1502 of FIG. 15*a*.

Following step 1533 adds the created equivalent evidences records to the equivalent evidences list 1073 of the evidence group layer created in step 1531 and subsequent step 1534 sorts the entries of the equivalent evidences list by a root cause relevance derived from the type of the evidences stored in each equivalent evidences record. As all evidences in an equivalent evidences record are of the same type, it is sufficient to fetch the evidence type 1002 of the first evidence contained in an equivalent evidences record to determine an evidence type based root cause score. Evidence type based root cause scores may either be fixed and based on heuristics, or they may be determined by machine learning approaches that learn the influence that evidences of specific types have on evidences on other types and that quantify those influences in form of root cause scores for the different evidence types. Variant methods to determine evidence type based root cause scores may first start with initial heuristic-based root cause scores which are then iteratively improved by a machine learning system.

The process then ends with step 1535.

Coming now to FIGS. 16*a*-16*b*, which provides two exemplary screenshots that visualize identified root cause groups and corresponding equivalent or same kind evidence data.

FIG. 16*a* shows a summary of the findings represented by a ranked evidence group 1080, which shows a summary of an identified main evidence group layer in the upper section 1600, consisting e.g. in data identifying the same purpose group for which evidences where grouped ("CheckDestination"), number of affected entity instances ("2 Response time degradations"), and additional evidences observed on the affected instances ("CPU saturation", "Metric anomalies"). For each observed evidence summary, a link to detail data 1601 ("Analyze findings) is available. The lower part of the visualization 1602 provides a detailed view of the topology instance entities that are involved in the currently analyzed problem, together with their topological connections and the identified causal dependencies between evidences that were observed on those topology instances.

FIG. 16*b* shows a screen shot of the visualization of equivalent or same kind evidences as stored in the equivalent evidences list 1073 of an evidence group layers 1070.

Underlying measurement data of identified same kind evidences is presented in rows, where each row represents a stack level, and the rows are sorted according to the position in the stack. The first row 1610 displays found evidences on the service level in form of a time series visualization. Four different time series displaying response time data are shown in the first and only chart on the service stack level. All four time series show abnormal values starting about 10 minutes before 8:00 am. The period for which data is displayed may be defined by the temporal focus 1083 of the currently displayed ranked evidence group. The temporal focus of the ranked evidence group is indicated by a line 1613 above the charts.

The process level 1611 shows two time series chars, one for process CPU usage time series and one for the number of retransmitted packets that were received per second. Also, those charts show time series data for which abnormal behavior was detected. The charts are sorted from left to right according to the evidence type 1614 based root cause relevance of the corresponding evidence types, starting with the highest root cause relevancy on the left and continuing with decreasing root cause relevancy.

The host level 1614 also shows two time series charts, one for evidence data of type CPU idle and one for disk write time, which also show evidence data sorted by evidence type base root cause relevance.

Different identified ranked evidence groups may be presented to the user according to their group root cause rank 1081, starting with the ranked evidence group having the highest group root cause rank and then advancing with descending root cause ranks.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for monitoring performance in a distributed computing environment, comprising:

identifying a plurality of abnormal operating conditions in the distributed computing environment;

identifying causal relationships between abnormal operating conditions in the plurality of abnormal operating conditions using a topology model and thereby forming a set of causally related abnormal operating conditions, where the topology model defines relationships between entities in the distributed computing environment;

identifying entities in the topology model having the same purpose;

grouping abnormal operating conditions in the set of causally related abnormal operating conditions into horizontal groups in accordance with the entities on which the abnormal operating conditions occurred, where abnormal operating conditions in a given horizontal group occurred on entities having the same purpose; and for each horizontal group, analyzing the abnormal operating conditions of a given horizontal group to determine relevance as a root cause #si in the given horizontal group.

2. The computer-implemented method of claim 1 further comprises identifying services that execute same code as entities in the topology model that serve the same purpose.

3. The computer-implemented method of claim 1 further comprises identifying processes that start with same or similar command line as entities in the topology model that serve the same purpose.

4. The computer-implemented method of claim 1 wherein identifying causal relationships between abnormal operating conditions in the plurality of abnormal operating conditions further comprises receiving a trigger event, where the trigger event indicates a particular abnormal operating condition and a particular entity in the topology model on which the particular abnormal operating condition occurred;

determining other entities in the topology model directly connected to the particular entity; and determining other abnormal operating conditions associated with the other entities, thereby identifying causal relationships between the particular abnormal operating condition and the other abnormal operating conditions.

5. The computer-implemented method of claim 1 wherein analyzing the horizontal groups further comprises ranking groups in the horizontal groups in accordance with its relevance as a root cause and visualizing the ranked groups on a display of a computing device.

6. The computer-implemented method of claim 1 further comprises ranking groups in the horizontal groups by computing a metric for a given abnormal operating condition in a given group, where the metric indicates a number of transitions from an entity that represents an entry point into the system to an entity on which the given abnormal operating condition was observed.

7. The computer-implemented method of claim 1 further comprises
for each group in the horizontal groups, computing a metric for each abnormal operating condition in a given group, where the metric indicates an average number of transitions from an entity that represents an entry point into the system to an entity on which the given abnormal operating condition was observed;
for each group in the horizontal groups, identify the metric having highest value in a given group and normalize the identified metric to have a value between zero and one to yield a root cause score; and
ranking groups in the horizontal groups according to the root cause scores.

8. The computer-implemented method of claim 1 further comprises
identifying entities in the topology model that have a resource provision/consumption relationship, where one entity consumes computing resources provisioned by another entity in the resource provision/consumption relationship;
grouping abnormal operating conditions in the set of causally related abnormal operating conditions into vertical groups, where abnormal operating conditions in a given vertical group occurred on entities having a resource provision/consumption relationship.

9. A computer-implemented method for monitoring performance in a distributed computing environment, comprising:
identifying a plurality of abnormal operating conditions in the distributed computing environment;
identifying causal relationships between abnormal operating conditions in the plurality of abnormal operating conditions using a topology model and thereby forming a set of causally related abnormal operating conditions, where the topology model defines relationships between entities in the distributed computing environment;
identifying entities in the topology model having the same purpose;
grouping abnormal operating conditions in the set of causally related abnormal operating conditions into horizontal groups in accordance with the entities on which the abnormal operating conditions occurred, where abnormal operating conditions in a given horizontal group occurred on entities having the same purpose;
identifying entities in the topology model that have a resource provision/consumption relationship, where one entity consumes computing resources provisioned by another entity in the resource provision/consumption relationship;
grouping abnormal operating conditions in the set of causally related abnormal operating conditions into vertical groups in accordance with identified resource provision/consumption relationships, where abnormal operating conditions in a given vertical group occurred on entities having a resource provision/consumption relationship; and
analyzing the horizontal groups and the vertical groups to determine relevance as a root cause for the abnormal operating conditions.

10. The computer-implemented method of claim 9 further comprises identifying a particular service provided by a particular process and the particular process as entities in the topology model that have a resource provision/consumption relationship.

11. The computer-implemented method of claim 9 further comprises identifying a particular process executed on a particular host computer and the particular host computer as entities in the topology model that have a resource provision/consumption relationship.

12. The computer-implemented method of claim 9 wherein identifying causal relationships between abnormal operating conditions in the plurality of abnormal operating conditions further comprises
receiving a trigger event, where the trigger event indicates a particular abnormal operating condition and a particular entity in the topology model on which the particular abnormal operating condition occurred;
determining other entities in the topology model directly connected to the particular entity; and
determining other abnormal operating conditions associated with the other entities, thereby identifying causal relationships between the particular abnormal operating condition and the other abnormal operating conditions.

13. The computer-implemented method of claim 9 wherein analyzing the horizontal groups and the vertical groups further comprises
combining horizontal groups with vertical groups to form combined groups, such that, for a particular combined group, at least one abnormal operating condition in a particular horizontal group of the given combined group and at least one abnormal operating condition in a particular vertical group of the given combined group occurred on same entity;
for vertical groups, identifying an entity within a vertical group as an anchor entity, where the anchor entity is a process or an entity upon which a process relies for computing resources; and
merging combined groups with each other to form root cause groups, where combined groups in a particular root cause group share an anchor node.

14. The computer-implemented method of claim 13 wherein analyzing the horizontal groups and the vertical groups further comprises ranking groups in the root cause groups in accordance with their relevance as a root cause and visualizing the ranked groups on a display of a computing device.

15. The computer-implemented method of claim 13 further comprises ranking groups in the root cause groups by computing a metric for a given abnormal operating condition in a given group, where the metric indicates a number of transitions from an entity that represents an entry point into the system to an entity on which the given abnormal operating condition was observed.

16. The computer-implemented method of claim 13 further comprises for each group in the root cause groups, computing a metric for each abnormal operating condition in a given group, where the metric indicates an average number of transitions from an entity that represents an entry point into the system to an entity on which the given abnormal operating condition was observed;

for each group in the root cause groups, identify the metric having highest value in a given group and normalize the identified metric to have a value between zero and one to yield a root cause score; and ranking groups in the root cause groups according to the root cause scores.

17. The computer-implemented method of claim 16, further comprises, for each group in the root cause groups, for each particular root cause group, grouping abnormal operating conditions contained in the particular root cause group by the type of the abnormal operating condition to form groups of abnormal operating conditions of the same type; and ranking the groups of abnormal operating conditions of the same type using an evidence type root cause score derived from the abnormal operating condition type.

18. The computer-implemented method of claim 17, where the type root cause score derived from abnormal operating condition types is based on a heuristic.

19. The computer-implemented method of claim 17, further comprising, for each group of abnormal operating conditions of the same type, for each particular abnormal operating condition in each particular group of abnormal operating conditions of the same type, calculating an instance root cause score for each particular abnormal operating condition, where the instance root cause score is derived from the observation data describing the particular abnormal operating condition; and ranking the particular abnormal operating conditions of each particular group of abnormal operating conditions of the same type according to the instance root cause score.

20. The computer-implemented method of claim 19, further comprising, deriving the instance root cause score from the extend of the deviation from a normal operating condition described by the observation data describing the particular abnormal operating condition.

* * * * *